(12) United States Patent
Zhang et al.

(10) Patent No.: US 11,984,659 B2
(45) Date of Patent: May 14, 2024

(54) PHASE PRE-COMPENSATION FOR MISALIGNMENT

(71) Applicant: QUALCOMM Incorporated, San Diego, CA (US)

(72) Inventors: Danlu Zhang, Rancho Santa Fe, CA (US); Yehonatan Dallal, Kfar Saba (IL); Idan Michael Horn, Hod Hasharon (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 217 days.

(21) Appl. No.: 17/356,059

(22) Filed: Jun. 23, 2021

(65) Prior Publication Data
US 2022/0416417 A1    Dec. 29, 2022

(51) Int. Cl.
*H01Q 3/26* (2006.01)
*H01Q 21/29* (2006.01)
*H04B 7/06* (2006.01)

(52) U.S. Cl.
CPC .......... *H01Q 3/2605* (2013.01); *H01Q 21/29* (2013.01); *H04B 7/0671* (2013.01)

(58) Field of Classification Search
CPC ..... H01Q 3/2605; H01Q 21/29; H04B 7/0671
See application file for complete search history.

(56) References Cited

U.S. PATENT DOCUMENTS

| | | | |
|---|---|---|---|
| 6,441,779 B1* | 8/2002 | Bennett | H01Q 3/06 701/472 |
| 11,309,977 B2* | 4/2022 | Tang | H04B 17/21 |
| 2021/0091863 A1* | 3/2021 | Tang | H04B 17/12 |
| 2021/0257730 A1* | 8/2021 | Ma | H04B 7/086 |

FOREIGN PATENT DOCUMENTS

| | | |
|---|---|---|
| JP | 2017224988 A | 12/2017 |
| JP | 2018037744 A | 3/2018 |

OTHER PUBLICATIONS

International Search Report and Written Opinion—PCT/US2022/030916—ISA/EPO—dated Sep. 13, 2022.
Moon J., et al., "Line-of-Sight Communications with Antenna Misalignments", ICC 2021—IEEE International Conference on Communications, IEEE, Jun. 14, 2021, pp. 1-6, XP033953930, figures 1, 2, 5, section II.

* cited by examiner

*Primary Examiner* — Junpeng Chen
(74) *Attorney, Agent, or Firm* — Kevin M. Donnelly; Holland & Hart LLP

(57) ABSTRACT

Methods, systems, and devices for wireless communications are described. A first device may transmit, from a first antenna of a first antenna array of the first device to a second antenna of a second antenna array of a second device, a first set of reference signals. The first device may transmit, from a first plurality of antennas of the first antenna array to a second plurality of antennas of the second antenna array, a second plurality of reference signals. The first device may receive, from the second device, an indication based at least in part on a linear offset and one or more rotational offsets estimated by the second device associated with the first set of reference signals and the second plurality of reference signals. The first device may communicate with the second device using the first antenna array based on the indication.

39 Claims, 13 Drawing Sheets

PHASE PRE-COMPENSATION FOR MISALIGNMENT

TECHNICAL FIELD

The following relates to wireless communications, including determining misalignment conditions between a transmitting antenna array and a receiving antenna array and pre-compensating the antenna arrays based on the misalignment condition.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-a ccess communications system may include one or more base stations or one or more network access nodes, each simultaneously supporting communication for multiple communication devices, which may be otherwise known as user equipment (UE).

In multiple input, multiple output (MIMO) wireless communication scenarios, devices may communicate using antenna arrays to support relatively higher throughput. In some cases, devices may communicate using orbital angular momentum (OAM) multiplexing. In these environments, it may be beneficial for two antenna arrays to be aligned in order to support orthogonality of related signaling.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. A method for wireless communication at a first device is described. The method may include transmitting, from a first antenna of a first antenna array of the first device to a second antenna of a second antenna array of a second device, a first set of reference signals that includes one or more reference signals, transmitting, from a first set of multiple antennas of the first antenna array to a second set of multiple antennas of the second antenna array, a second set of multiple reference signals, receiving, from the second device, an indication based on a linear offset and one or more rotational offsets estimated by the second device associated with the first set of reference signals and the second set of multiple reference signals, and communicating with the second device using the first antenna array based on the indication.

Another innovative aspect of the subject matter described in this disclosure can be implemented in an apparatus for wireless communication. The apparatus may include a processor, memory coupled with the processor, and instructions stored in the memory. The instructions may be executable by the processor to cause the apparatus to transmit, from a first antenna of a first antenna array of the first device to a second antenna of a second antenna array of a second device, a first set of reference signals that includes one or more reference signals, transmit, from a first set of multiple antennas of the first antenna array to a second set of multiple antennas of the second antenna array, a second set of multiple reference signals, receive, from the second device, an indication based on a linear offset and one or more rotational offsets estimated by the second device associated with the first set of reference signals and the second set of multiple reference signals, and communicate with the second device using the first antenna array based on the indication.

Another innovative aspect of the subject matter described in this disclosure can be implemented in an apparatus for wireless communication. The apparatus may include means for transmitting, from a first antenna of a first antenna array of the first device to a second antenna of a second antenna array of a second device, a first set of reference signals that includes one or more reference signals, means for transmitting, from a first set of multiple antennas of the first antenna array to a second set of multiple antennas of the second antenna array, a second set of multiple reference signals, means for receiving, from the second device, an indication based on a linear offset and one or more rotational offsets estimated by the second device associated with the first set of reference signals and the second set of multiple reference signals, and means for communicating with the second device using the first antenna array based on the indication.

Another innovative aspect of the subject matter described in this disclosure can be implemented in a non-transitory computer-readable medium storing code for wireless communication at a first device. The code may include instructions executable by a processor to transmit, from a first antenna of a first antenna array of the first device to a second antenna of a second antenna array of a second device, a first set of reference signals that includes one or more reference signals, transmit, from a first set of multiple antennas of the first antenna array to a second set of multiple antennas of the second antenna array, a second set of multiple reference signals, receive, from the second device, an indication based on a linear offset and one or more rotational offsets estimated by the second device associated with the first set of reference signals and the second set of multiple reference signals, and communicate with the second device using the first antenna array based on the indication.

Another innovative aspect of the subject matter described in this disclosure can be implemented in a method. The method may include receiving, at a first antenna of a first antenna array of the first device from a second antenna of a second antenna array of a second device, a first set of reference signals that includes one or more reference signals, measuring, based on receiving the first set of reference signals, one or more first phases for the first set of reference signals, estimating, based on the one or more first phases for the first set of reference signals, a linear offset between the first antenna array and the second antenna array, receiving, at a first set of multiple antennas of the first antenna array of the first device from a second set of multiple antennas of the second antenna array of the second device, a second set of multiple reference signals, measuring, based on receiving the second set of multiple reference signals, a second set of multiple phases of each of the second set of multiple reference signals, estimating, based on the second set of multiple phases of the second set of multiple reference signals, one or more rotational offsets between the first antenna array and the second antenna array, and transmitting, to the second device, an indication based on the linear offset and the one or more rotational offsets.

Another innovative aspect of the subject matter described in this disclosure can be implemented in an apparatus. The apparatus may include a processor, memory coupled with the processor, and instructions stored in the memory. The instructions may be executable by the processor to cause the apparatus to receive, at a first antenna of a first antenna array of the first device from a second antenna of a second antenna array of a second device, a first set of reference signals that includes one or more reference signals, measuring, base at least in part on receiving the first set of reference signals, one or more first phases for the first set of reference signals, estimating, base at least in part on the one or more first phases for the first set of reference signals, a linear offset between the first antenna array and the second antenna array, receive, at a first set of multiple antennas of the first antenna array of the first device from a second set of multiple antennas of the second antenna array of the second device, a second set of multiple reference signals, measuring, base at least in part on receiving the second set of multiple reference signals, a second set of multiple phases of each of the second set of multiple reference signals, estimating, base at least in part on the second set of multiple phases of the second set of multiple reference signals, one or more rotational offsets between the first antenna array and the second antenna array, and transmit, to the second device, an indication based on the linear offset and the one or more rotational offsets.

Another innovative aspect of the subject matter described in this disclosure can be implemented in an apparatus at a first device. The apparatus may include means for receiving, at a first antenna of a first antenna array of the first device from a second antenna of a second antenna array of a second device, a first set of reference signals that includes one or more reference signals, means for measuring, based on receiving the first set of reference signals, one or more first phases for the first set of reference signals, means for estimating, based on the one or more first phases for the first set of reference signals, a linear offset between the first antenna array and the second antenna array, means for receiving, at a first set of multiple antennas of the first antenna array of the first device from a second set of multiple antennas of the second antenna array of the second device, a second set of multiple reference signals, means for measuring, based on receiving the second set of multiple reference signals, a second set of multiple phases of each of the second set of multiple reference signals, means for estimating, based on the second set of multiple phases of the second set of multiple reference signals, one or more rotational offsets between the first antenna array and the second antenna array, and means for transmitting, to the second device, an indication based on the linear offset and the one or more rotational offsets.

Another innovative aspect of the subject matter described in this disclosure can be implemented in a non-transitory computer-readable medium storing code for wireless communication at a first device is described. The code may include instructions executable by a processor to receive, at a first antenna of a first antenna array of the first device from a second antenna of a second antenna array of a second device, a first set of reference signals that includes one or more reference signals, measuring, base at least in part on receiving the first set of reference signals, one or more first phases for the first set of reference signals, estimating, base at least in part on the one or more first phases for the first set of reference signals, a linear offset between the first antenna array and the second antenna array, receive, at a first set of multiple antennas of the first antenna array of the first device from a second set of multiple antennas of the second antenna array of the second device, a second set of multiple reference signals, measuring, base at least in part on receiving the second set of multiple reference signals, a second set of multiple phases of each of the second set of multiple reference signals, estimating, base at least in part on the second set of multiple phases of the second set of multiple reference signals, one or more rotational offsets between the first antenna array and the second antenna array, and transmit, to the second device, an indication based on the linear offset and the one or more rotational offsets.

DETAILED DESCRIPTION

Figure 1:
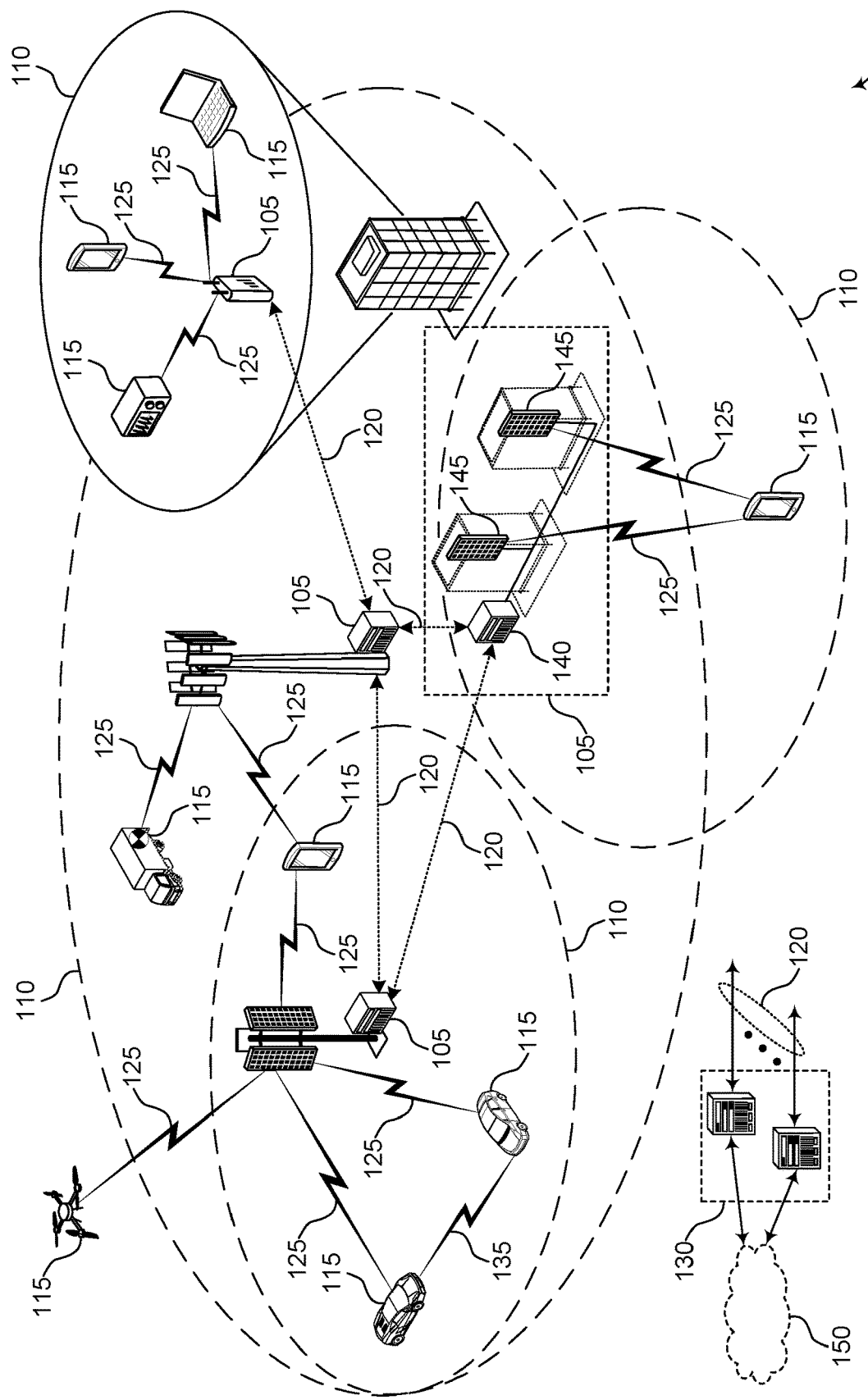
FIG. 1 illustrates an example of a wireless communications system that supports phase pre-compensation for misalignment in accordance with aspects of the present disclosure.

Various wireless communication schemes, such as line-of-site multiple-input multiple-output (LoS-MIMO), are being considered for advanced wireless communication systems (for example, 6G wireless communication systems) to, for example, support high throughput over short distances. In such environments, two network nodes may communicate using one or more antenna arrays. For example, each of the network nodes may include an orbital angular momentum (OAM) antenna system having multiple antennas arranged in one or more concentric circular antenna arrays, or an antenna system having one or more rectangular antenna arrays. The respective antenna arrays of the two network nodes may be installed such that they are aligned along a first axis (for example, a horizontal axis or a vertical axis) as well as rotationally (for example, such that that respective antenna elements of an antenna array of one network node are aligned with respective antenna elements of an antenna array of the other network node in various rotational axes). It is important that the two antenna arrays are aligned to support wireless communication, such as LoS-MIMO, regardless of the type of antenna arrays implemented, for example, whether OAM arrays or rectangular arrays are used. With any misalignment (for example, axial misalignment or rotational misalignment), between respective antenna arrays of two network nodes, modes in OAM LoS-MIMO between the network nodes may lose orthogonality, which may result in signal loss, among other disadvantages.

Various aspects generally relate to determining two or more misalignment conditions (for example, a linear offset and one or more rotational angle offsets) associated with an antenna array of a receiving device and an antenna array of a transmitting device, and precompensating for these misalignment conditions, such as in a sequential manner. In some aspects, the receiving device may report the misalignment conditions to the transmitter device, which may then use one or more precompensation techniques, such as beamforming. First, the receiving device may estimate a linear offset between an antenna array of the receiving device and an antenna array of the transmitting device based on phase measurements of a first set of reference signals transmitted by the antenna array of the transmitting device and received by an antenna of the antenna array of the receiving device. The receiving device may transmit or otherwise provide an indication of the linear offset to the transmitting device, which may apply precompensation to its antenna array to counter the linear offset. The receiving device may also estimate one or more rotational offsets based on phase measurements of a second set of reference signals transmitted between two or more antennas of the transmitting antenna array and two or more antennas of the receiving antenna array, referred to as "transmit-receive antenna pairs," which may in some examples be on or relatively near a peripheral edge of the antenna array. The receiving device may then transmit and indication of the one or more rotational offsets to the transmitting device. In some examples, the receiving device may transmit indications of the linear offset and the one or more rotational angles together. In some other examples, the receiving device may transmit the indication of the linear offset first and then subsequently transmit the indication of the rotational offset(s). The transmitting device may then apply further precompensation to its antenna array, for example using beam steering or other mechanisms, as needed, to counter the one or more rotational offsets.

Particular aspects of the subject matter described in this disclosure may be implemented to realize one or more of the following potential advantages. The techniques employed by the described communication devices may provide benefits and enhancements to the operation of the communication devices, including supporting orthogonality between transmissions, such as for LoS-MIMO transmissions, which may result in communication efficiencies, among other benefits. For example, operations performed by the described communication devices may provide improvements to LoS-MIMO procedures by precompensating for a loss of orthogonality that may otherwise occur between the devices due to misalignment of one or more antenna arrays of the transmitting device and one or more antenna arrays of the receiving device. In some examples, operations performed by the described communication devices and related precompensation at the transmitting device may also support improvements to power consumption, reliability for communications, spectral efficiency, higher data rates and, in some examples, low latency for communications, among other benefits.

Aspects of the disclosure are initially described in the context of wireless communications systems. Aspects of the disclosure are further illustrated by and described with reference to apparatus diagrams, system diagrams, and flowcharts that relate to phase pre-compensation for misalignment.

FIG. 1 illustrates an example of a wireless communications system 100 that supports phase pre-compensation for misalignment in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, where the symbol period and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of T, $=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (for example, over a carrier) and may be associated with an identifier for distinguishing neighboring cells (for example, a physical cell identifier (PCID), a virtual cell identifier (VCID), or others). In some examples, a cell may also refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (for example, MTC, narrowband IoT (NB-IoT), enhanced mobile broadband (eMBB)) that may provide access for different types of devices.

In some examples, a base station 105 may be movable and provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (for example, by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (for example, by a base station 105 or a UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A first device (for example, the UE 115 or the base station 105, which may be a receiving device in this example) may receive, at a first antenna of a first antenna array of the first device from a second antenna of a second antenna array of a second device, a first set of reference signals that includes one or more reference signals. The first device may measure, based on receiving the first set of reference signals, one or more first phases for the first set of reference signals. The first device may estimate, based on the one or more first phases for the first set of reference signals, a linear offset between the first antenna array and the second antenna array. The first device may receive, at a first plurality of antennas of the first antenna array of the first device from a second plurality of antennas of the second antenna array of the second device, a second plurality of reference signals. The first device may measure, based on receiving the second plurality of reference signals, a second plurality of phases of each of the second plurality of reference signals. The first device may estimate, based on the second plurality of phases of the second plurality of reference signals, one or more rotational offsets between the first antenna array and the second antenna array. The first device may transmit, to the second device, an indication based on the linear offset and the one or more rotational offsets.

A first device (which may be an example of a UE 115 or base station 105, and may be an example of the second device described in the example above) may transmit, from a first antenna of a first antenna array of the first device to a second antenna of a second antenna array of a second device, a first set of reference signals that includes one or more reference signals. The first device may transmit, from a first plurality of antennas of the first antenna array to a second plurality of antennas of the second antenna array, a second plurality of reference signals. The first device may receive, from the second device, an indication based on a linear offset and one or more rotational offsets estimated by the second device associated with the first set of reference signals and the second plurality of reference signals. The first device may communicate with the first device using the second antenna array based on the indication.

Figure 2A:
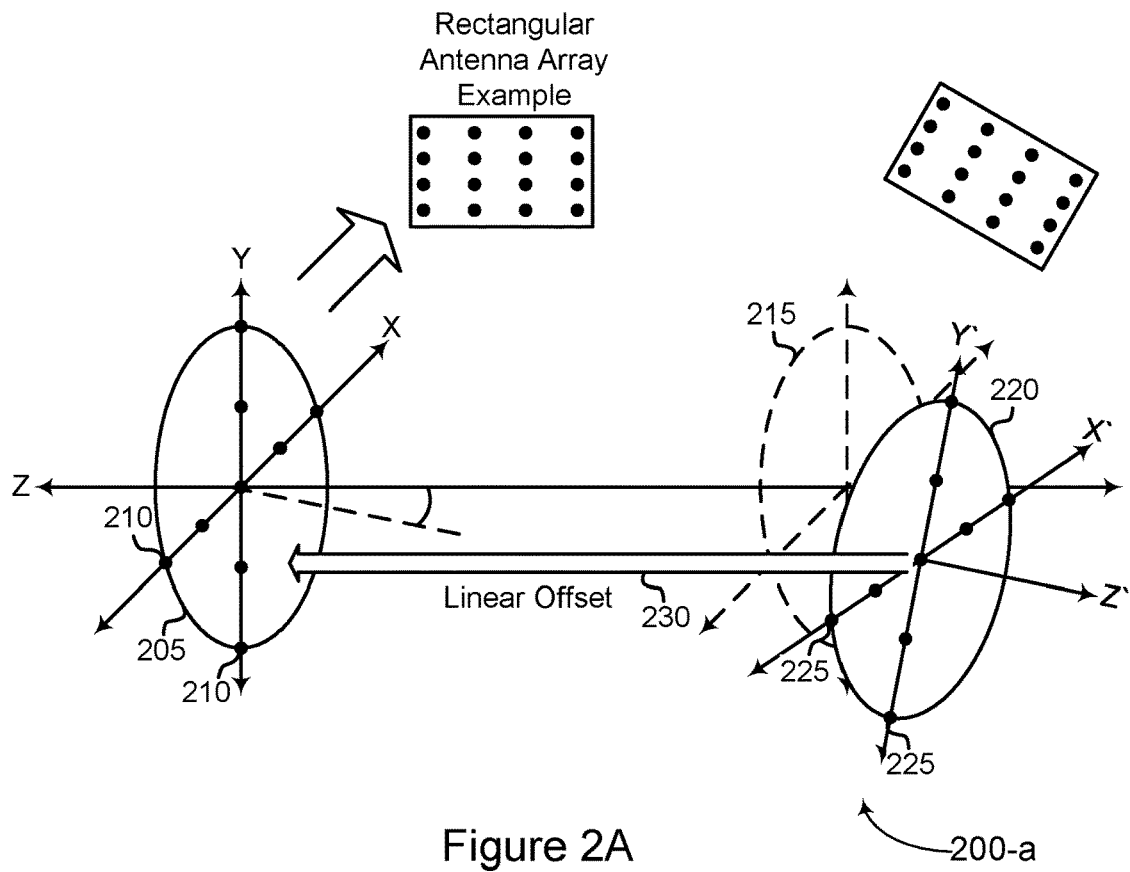
FIGS. 2A and 2B illustrate an example of an antenna array configuration that supports phase pre-compensation for misalignment in accordance with aspects of the present disclosure.
Figure 2B:
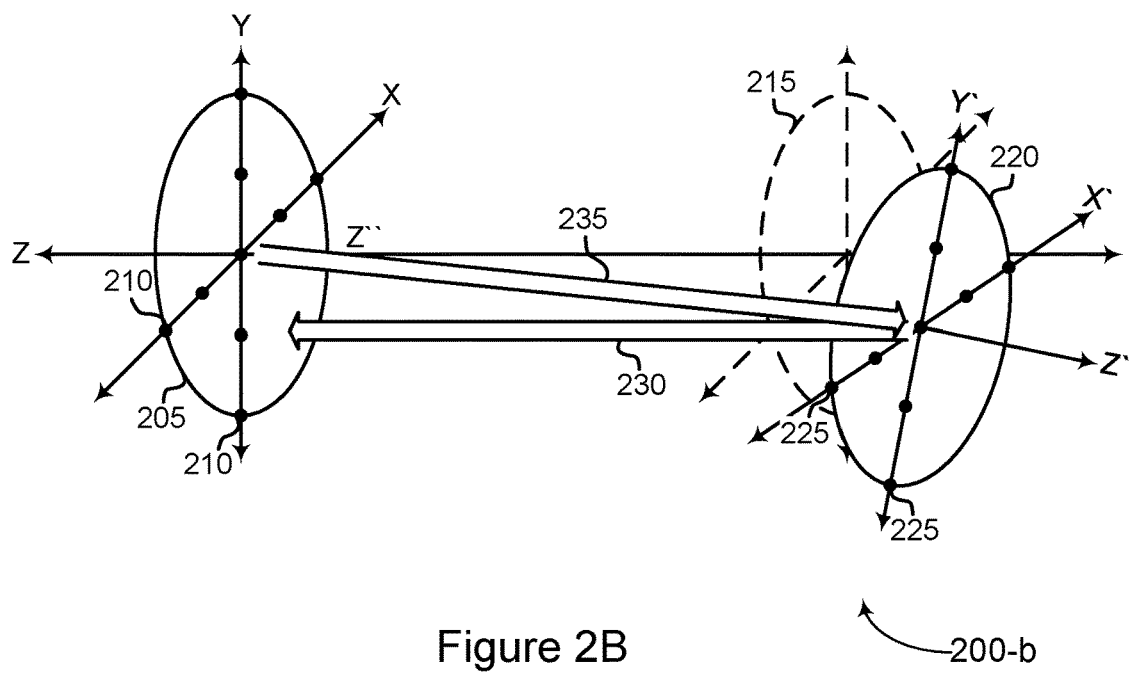

FIGS. 2A and 2B illustrate an example of an antenna array configuration 200 that supports phase pre-compensation for misalignment in accordance with aspects of the present disclosure. The antenna array configuration 200 may implement aspects of or be implemented by the wireless communications system 100. The antenna array configuration 200 may include a second antenna array 205 associated with a second device and a first antenna array 220 associated with a first device. In some aspects, the first device or the second device (or both) may be a UE or a base station (or some combination), which may be examples of the corresponding devices described herein.

The techniques described herein may be implemented by the first and second devices to align/compensate for misalignment between the second antenna array 205 and the first antenna array 220. Accordingly, the techniques described herein may be applied for UE-to-UE, base station-to-base station, UE-to-base station, or base station-to-UE antenna array alignment/compensation between the first antenna array 220, and the second antenna array 205, or both.

As discussed herein, wireless communication systems may be configured to support OAM and other LoS-MIMO schemes to increase throughput over a short distance LoS deployment scenario. These deployment scenarios may include the first device installing, establishing, or otherwise configuring the first antenna array 220 and the second device installing, establishing, or otherwise configuring the second antenna array 205 such that each antenna array is coplanar with respect to the other antenna array. That is, each antenna array may include a plurality of antenna elements (for example, antenna elements 210 of the second antenna array 205 and antenna elements 225 of the first antenna array 220). Each antenna array may have a circular shape, rectangular shape, oval shape, or square shape, among other examples. The aim if installing such antenna arrays is that the planar face of each antenna array is perfectly coplanar with respect to the planar face of the other antenna array along the Z axis, and are rotated such that each antenna element is aligned with a corresponding antenna element of the other antenna array (for example, antenna pairs) along the X and Y axis (for example, are rotated similarly around the Z axis). This may support Fresnel diffraction, which may be key to the presence of multiple channels supporting the MIMO communications with LoS.

Alignment of the receiving plane to the transmitting plane (for example, alignment of the planar face of the second antenna array 205 and the first antenna array 220) are important aspects for such LoS MIMO schemes, regardless of whether OAM (for example, concentric circles) or rectangular antenna arrays are used. Without such alignment, the modes in OAM and LoS-MIMO lose orthogonality with respect to each other, thus disrupting communications.

Typically, misalignment of the first antenna array 220 and the second antenna array 205 is common (at least initially), and therefore an alignment procedure is necessary before the communications sessions are established between the first device and the second device. Misalignment in some scenarios may include a linear offset (for example, linear off-axis) in which the planar face of the antenna arrays are offset along the Z axis, as well as rotational offset(s) in which the planar face of the antenna arrays are rotated around the Z axis or the planar face of one antenna array is tilted or otherwise leans such that it is not parallel to the planar face of the other antenna array. Accordingly, various degrees of freedom be present in the misalignment of the antenna arrays corresponding to the linear axis or the rotational offset(s) or both. If such misalignment is present, the transformation matrix has numerous variables that are tangled together, which makes it difficult to analyze or correct (or both) for the misalignment between the first antenna array 220 and the second antenna array 205.

One example of such misalignment is illustrated in the antenna array configuration 200-a of FIG. 2A. In this example, the second antenna array 205 is configured as shown such that the planar face of the second antenna array 205 is perpendicular to the Z axis and rotated such that the antenna elements 210 are positioned along the X and Y axis. An ideal placement for the first antenna array 220 is illustrated in dashed lines as antenna array placement 215. That is, antenna array placement 215 illustrates the ideal alignment of the first antenna array 220 with respect to the second antenna array 205. However, in the example illustrated in FIG. 2A, there is misalignment between the first antenna array 220 and the second antenna array 205. More particularly, the misalignment includes the first antenna array 220 being positioned below the Z axis, and therefore having a corresponding linear offset 230. That is, a transmission from a center antenna element 225 of the first antenna array 220 may not align with the corresponding center antenna element 210 of the second antenna array 205.

Additionally, the first antenna array 220 is rotated about the Z axis such that the X and Y axis of the first antenna array 220 are not aligned with the corresponding X and Y axis of the second antenna array 205. Furthermore, the first antenna array 220 is tilted along the X/Y axis such that the planar face of the second antenna array 205 is not parallel with the planar face of the first antenna array 220. Again, if such misalignment is present, the variables of the transformation matrix are tangled to such a degree that analyzing or otherwise quantifying the misalignment between the second antenna array 205 and the first antenna array 220 is extremely difficult, and potentially sometimes prohibitively difficult. For example, it may not be feasible to have a reasonable sized set of codewords to use for pre-compensation due to the high dimensions (for example, the numerous degrees of freedom between the antenna array's misalignment). Moreover, physical alignment of the second antenna array 205 to the first antenna array 220 may be difficult in some mobility use cases. Finally, in some situations it may be impractical to physically place a lens (or other physical alignment aid) between the second antenna array 205 and the first antenna array 220 to aid in alignment.

Figure 3A:
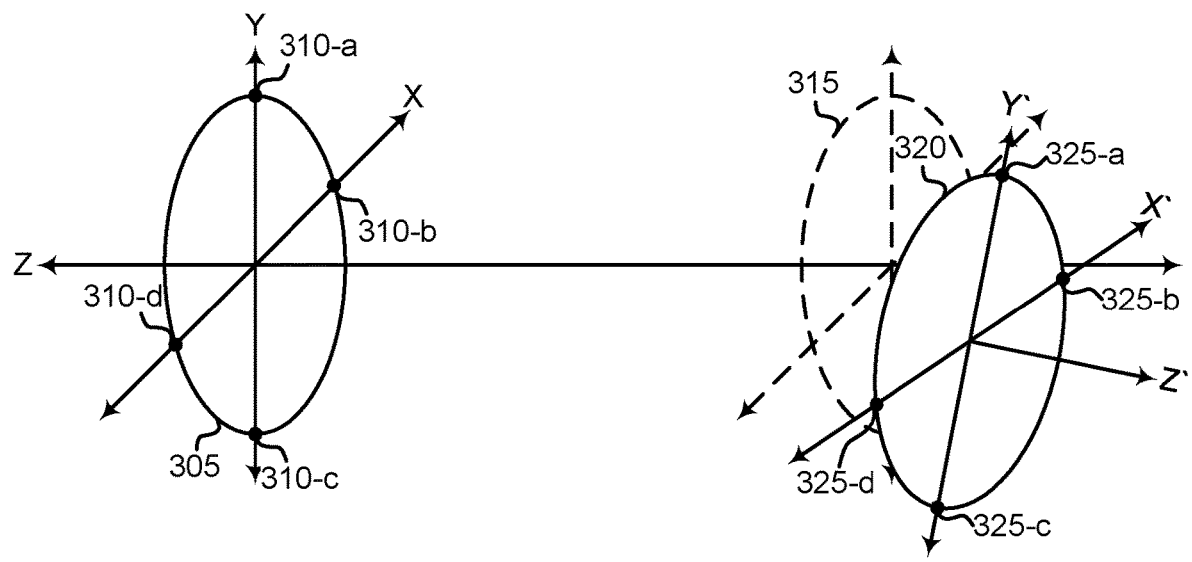
FIGS. 3A and 3B illustrate an example of an antenna array configuration that supports phase pre-compensation for misalignment in accordance with aspects of the present disclosure.
Figure 3B:
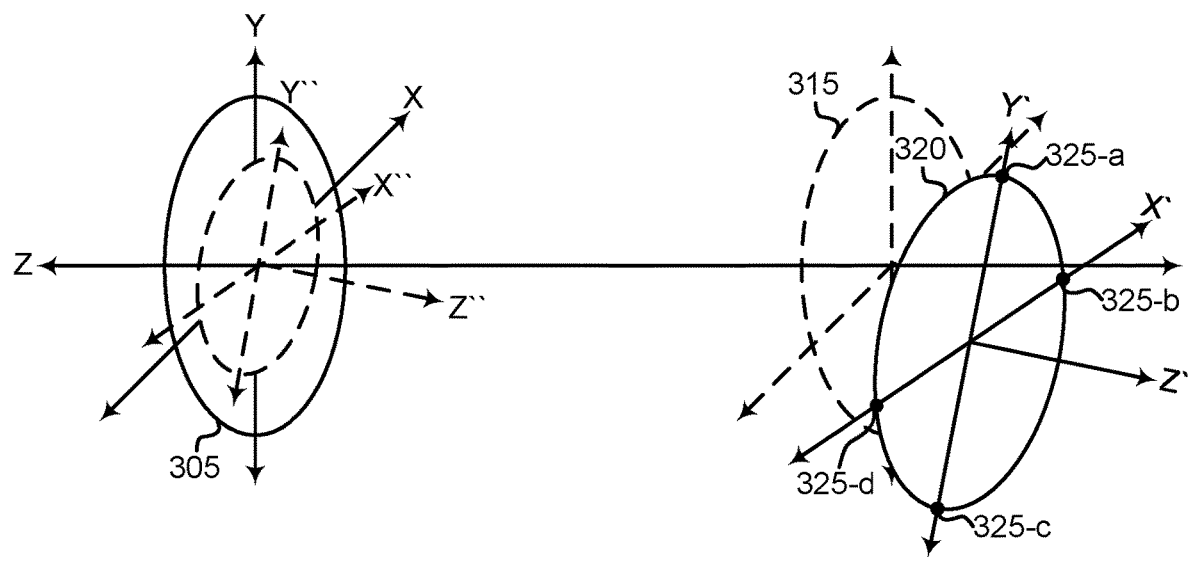

Accordingly, aspects of the described techniques provide for a sequential method to find and apply accurate phase pre-compensation at the transmitting device (for example, the second device in this example) to compensate for the linear axis offset as well as the rotational offset(s) between the second antenna array 205 and the first antenna array 220. Broadly, the linear axis offset (for example, the off-axis offset) is initially estimated based on phase measurements at the center antenna arrays along the X and Y axis using a reference signal transmitted from the second device. After the linear offset has been estimated and compensated for, the rotational offsets are then estimated and compensated for using multiple reference signals transmitted from the peripheral antenna elements 210 of the second antenna array 205. For example, the rotational offset(s) are estimated based on phase measurements among the antenna element pairs along the X and Y axis using reference signals transmitted from the corresponding antenna array antenna elements. Accordingly, the phase terms from the rotational offsets are no longer tangled with the linear offset, which supports sequentially estimating and correcting for the linear offset or rotational offset(s) (or both). FIGS. 2A and 2B illustrate examples of the linear offset estimation/pre-compensation aspects of the described techniques, with FIGS. 3A and 3B illustrating examples of the rotational offset(s) estimation/pre-compensation aspects of the described techniques.

Accordingly, this may include the second device transmitting a first set of reference signals (for example, one or more reference signals). Broadly, the first set of reference signals may be transmitted from a central or center antenna element 210 of the second antenna array 205 of the second device. The first set of reference signals may be transmitted to a corresponding central or center antenna element 225 of the first antenna array 220 of the first device (for example, the corresponding antenna pair). The first device may receive the first set of reference signals at the first antenna element 225 of the first antenna array 220 transmitted from the second device. Accordingly, the first device may measure a first phase of each reference signal in the first set of reference signals (e.g., one or more first phases). Based on the first phase(s) measured by the first device, the first device may then estimate the linear offset between the first antenna array 220 and the second antenna array 205. For example, the first device may determine the difference between the distance between the first antenna element 225 and the second antenna element 225 and the distance between other antenna elements 210 and the second antenna element 225 along the linear axis that is perpendicular to the plane (for example, the planar face) of the second antenna array 205. More particularly, the first device may not directly determine the distance between the respective antenna elements, but the first device may estimate the difference in the distances based on the phase measurements in order to determine the linear offsets. The first device may evaluate (for example, compare) a physical distance between the center of the first antenna array 220 and the center of the second antenna array 225 along the linear axis to determine or otherwise estimate or calculate the linear offset. That is, the distance may correspond to the horizontal distance along the horizontal axis and a vertical distance along a vertical axis. The horizontal axis and the vertical axis (for example, the X and Y planes, respectively) may be perpendicular to the plane of the second antenna array 205.

In some aspects, rectangular coordinates may be used for the algorithms, although the results may be easy applicable to OAM and Polar coordinates. The coordinates for the receive plane (for example, for the first antenna array 220) may have their origin at $(X_0, Y_0, Z_0)$ and $(-\gamma, -\beta, -\alpha)$ with respect to the X-, Y-, and Z-axis. The coordinates for the transmit plane (for example, for the second antenna array 205) may be at a rotational offset of $(\gamma, \beta, \alpha)$ with respect to the Z-, Y-, and X-axis, respectively.

With respect to coordinate transform (for example, with respect to the rotation matrix), a point with receive plane coordinates of (x', y', z') has its coordinates in the transmit plane as according to Equation (1) below:

$$\begin{bmatrix} x \\ y \\ z \end{bmatrix} = \begin{bmatrix} x_0 \\ y_0 \\ z_0 \end{bmatrix} + \begin{bmatrix} \cos\alpha\cos\beta & \cos\alpha\sin\beta\sin\gamma - \sin\alpha\cos\gamma & \cos\alpha\sin\beta\cos\gamma + \sin\alpha\sin\gamma \\ \sin\alpha\cos\beta & \sin\alpha\sin\beta\sin\gamma + \cos\alpha\cos\gamma & \sin\alpha\sin\beta\cos\gamma - \cos\alpha\sin\gamma \\ -\sin\beta & \cos\beta\sin\gamma & \cos\beta\cos\gamma \end{bmatrix} \begin{bmatrix} x' \\ y' \\ z' \end{bmatrix} \quad (1)$$

In a direction solution approach to estimating/compensating for the misalignment, the coordinates $X_0, Y_0, Z_0, \gamma, \beta, \alpha$ leave six unknown variables to solve for, which may be difficult to solve for given the degree of freedom between the antenna arrays.

However, the techniques described herein provide an iterative approach to solve for these variables, to pre-compensate for the misalignment between the first antenna array 220 and the second antenna array 205. This may include making the transmit plane (for example, the second antenna array 205) appear as (x",y", z") to the receive plane (for example, the first antenna array 220).

As discussed herein, this may include the first device measuring a first phase of each reference signal on the first set of reference signals. This may include projecting the origin of the receive plane to the transmit plane along the Z axis (for example, corresponding to the linear offset 230). Estimating the linear offset 230 may include the first device measuring (for example, based on the first phase distance) the distance between the first antenna and the second antenna along the linear axis that is perpendicular to the plane of the second antenna array 205. For example, this may include the distance between the receive plane (0,0,0) and the transmit plane ($k_x$, $d_x$,0,0)—distance between the receive plane (0,0,0) and the receive plane (0,0,0).

In some aspects, the distance between the receive plane (0,0,0) (for example, the center of the first antenna array 220) and the transmit plane ($k_x$, $d_x$,0,0)—the distance between the receive plane (0,0,0,) and the transmit plane (0,0,0) may be as according to Equation (2) below:

$$\approx \frac{-2k_x d_x x_0 + k_x^2 d_x^2}{2z_0} \quad (2)$$

And the distance between the receive plane (0,0,0) and the transmit plane ($k_y$, $d_y$,0,0)—the distance between the receive plane (0,0,0) and the transmit plane (0,0,0) may be as according to Equation (3) below:

$$\frac{-2k_y d_y y_0 + k_y^2 d_y^2}{2z_0} \quad (3)$$

The receive plane (0,0,0) may be the same as $(X_0, Y_0, Z_0)$ in the transmit plane coordinates. With $d_x$ and $d_y$ known, the given observations at multiple $k_x$ and $k_y$, $x_0$, $Y_0$, and $z_0$ can be solved (for example, using linear regression). To remove phase ambiguity (for example, based on $2n$), this may include using dense frequency sampling by the reference signal, or may use extra units close to the origin (for example, additional centrally located antenna elements), or both, for phase de-ambiguity because multiple modes may use Equation (4) below:

$$\frac{d_{max}^2}{\lambda z_0} \sim 1 \quad (4)$$

The multiple transmit units (for example, antenna elements) used for the phase measurements may not have to be equally spaced along the two axis (for example, as long as their respective locations are known to the receive device, such as the second device in this example). As discussed, reference signals may be used for the transmitting units (for example, the antenna elements) to support the phase measurements (for example, measurement of the first phase), with each unit being along the two axis (for example, the X and Y axis).

In one alternative, the linear offset may be estimated according to the distance between the receive plane (0,0,0) and the transmit plane ($k_x d_x$, 0,0)—the distance between the receive plane (0,0,0) and the transmit plane($-k_x d_x$, 0,0) being according to Equation (5) below:

$$\approx \frac{-2k_x d_x x_0}{z_0} \quad (5)$$

The distance between the receive plane (0,0,0) and the transmit plane (0, $k_y d_y$, 0)—the distance between receive plane (0,0,0) and transmit plane (0, $-k_y d_y$, 0) being as according to Equation (6) below:

$$\approx \frac{-2k_y d_y y_0}{z_0} \quad (6)$$

With variables $k_x$, $k_y$, $d_x$ and $d_y$ known, the variables $$\frac{x_0}{z_0} \text{ and } \frac{y_0}{z_0}$$

can be solved. The variable $z_0$ by itself may or may not be used for alignment. This alternative also uses reference signals for the transmit units (for example, the antenna elements) used for phase measurements (for example, two units at the far end of each of the two axis).

To remove any ambiguity in the phase measurements, the total phase of reference signals (for example, the first set or second plurality of reference signals or both) from (x, y, 0) at sub-carrier f1 may be as according to Equation (7) below:

$$\frac{2\pi f_1 d_{(x,y)}}{c} = \varphi_1(f_1) + m_{1,f_1}(2\pi) \quad (7)$$

The total phase of reference signal from $(-x, y, 0)$ at sub-carrier f1 may be as according to Equations (8) and (9) below:

$$\frac{2\pi f_1 d_{(-x,y)}}{c} = \varphi_2(f_1) + m_{2,f_1}(2\pi) \tag{8}$$

$$\varphi_1(f_1) - \varphi_2(f_1) + (m_{1,f_1} - m_{2,f_1})(2\pi) = \frac{2\pi f_1}{c}(d_{(x,y)} - d_{(-x,y)}) \tag{9}$$

Likewise, $$\varphi_1(f_2) - \varphi_2(f_2) + (m_{1,f_2} - m_{2,f_2})(2\pi) = \frac{2\pi f_2}{c}(d_{(x,y)} - d_{(-x,y)})$$

and $\varphi_1(f_1)$, $\varphi_2(f_1)$, $\varphi_1(f_2)$, $\varphi_2(f_2)$ may be observable by channel estimation based on the reference signal(s), but the unknown integer multiple of $(2\pi)$ is also to be resolved.

If multiple of $(2\pi)$ remains in $[\varphi_1(f_1)-\varphi_2(f_1)]-[\varphi_1(f_2)-\varphi_2(f_2)]$, namely, $(m_{1,f1}-m_{2,f1}) \neq (m_{1,f2}-m_{2,f2})$, we may have $$\left|\frac{2\pi}{c}(f_1-f_2)(d_{(x,y)}-d_{(-x,y)})\right| \geq 2\pi,$$

this implies $$|(d_{(x,y)}-d_{(-x,y)})| \geq \frac{c}{|f_1-f_2|}.$$

In a typical use environment of passive MIMO, reference signals are placed densely in the frequency domain. $|f_1-f_2|$ may be on the order of sub-carrier spacing, or physical resource block size, among other examples. So it may be assumed that $|f_1-f_2| \sim 10^2$ kHz, then the corresponding ambiguity length $|(d_{(x,y)}-d_{(-x,y)})| \sim 10^3$ m, which is sufficient to remove the phase ambiguity. Accordingly, this may include reference signal samples in the frequency domain with a density of the order of $10^2$ kHz, and receiver using multiple sub-carriers in the reference signal to remove phase ambiguity. It may be assumed that phase ambiguity is removed in the estimated differential distance such as $|d_{(x,y)}-d_{(-x,y)}|$, although $d_{(x,y)}$ and $d_{(-x,y)}$ themselves may still have some degree of ambiguity. Accordingly, the first set of reference signals may be transmitted at a first frequency and the second plurality of reference signals may be transmitted at a second frequency that is within a frequency threshold of the first frequency.

Accordingly, the first device may determine the phase accuracy for the linear offset or the rotational offset(s) (or both) and adjust the first antenna array 220 or the second antenna array 205 (or both) accordingly.

In some aspects, the first device may transmit or otherwise convey an indication that the linear offset to the second device. The indication may be transmitted along with an indication of the rotational offsets (discussed with reference to FIGS. 3A and 3B) or may be provided initially such that the second device may adjust communication metric(s) to compensate for the linear offset before measuring and compensating for the rotational offset(s).

Referring next to antenna array configuration 200-b of FIG. 2B, the second device in this example may adjust or otherwise modify various metric(s) used for communications between the first antenna array 220 and the second antenna array 205. The alignment procedure may be based on the second device receiving the indication (for example, feedback) from the first device indicating the calculated offset of x0 and y0, and z0. The second device may apply, for $(k_x d_x, k_y d_y)$, an extra phase of the following, in effect steering the beam 235 toward the origin of the receive plane as according to Equation (10) below:

$$-\frac{\pi(-2k_x d_x x_0 + k_x^2 d_x^2 - 2k_y d_y y_0 + k_y^2 d_x^2 k_y^2)}{\lambda z_0} \tag{10}$$

Accordingly, adjusting the metric(s) used for communications between the first antenna array 220 and the second antenna array may include the second device applying various beam steering, beamforming, or other techniques in order to steer beam 235 from the center of the second antenna array 205 to the first antenna array 220. In some aspects, the second device may adjust a first subset of the metric(s) based on the indication before transmitting a second plurality of reference signals used for rotational offset estimation and measurement.

FIGS. 3A and 3B illustrate an example of an antenna array configuration 300 that supports phase pre-compensation for misalignment in accordance with aspects of the present disclosure. The antenna array configuration 300 may implement aspects of or be implemented by the wireless communications system 100 or aspects of the antenna array configuration 200 (or both). The antenna array configuration 300 may include a second antenna array 305 associated with a second device and a first antenna array 320 associated with a first device. In some aspects, the first device or the second device (or both) may be a UE or a base station (or some combination), which may be examples of the corresponding devices described herein.

Broadly, the antenna array configuration 300 continues the discussion of the antenna array configuration 200. That is, the discussion of antenna array configuration 200 included the second device transmitting or otherwise conveying a first set of reference signal(s) to a first antenna of the first antenna array 320 and from the second antenna of the second antenna array 305. The first device receives the first set of reference signal(s) and measures a first phase of each reference signal (e.g., one or more first phases for the first set of reference signals) and the first set of reference signal(s). Based on the first phase, the first device may estimate the linear offset between a first antenna array 320 and the second antenna array 305. The first device may transmit or otherwise provide an indication of the linear offset to the second device, which then adjust various metric(s) (for example, such as beam steering, beamforming, weighting factors) associated with communications between the first antenna array 320 and the second antenna array 305. As discussed herein, in some examples first device may transmit or otherwise provide the indication of the linear offset (for example, the actual linear offset or the first phase or both) before measuring and estimating for rotational offset(s) between the first antenna array 320 and the second antenna array 305. In other examples, the indication of the linear offset may be provided with the indication of the rotational offset(s). Antenna array configuration 300 provides an example in which the indication of the linear offset has been provided to the second device, which has adjusted the metric(s) to compensate for the linear offset prior to transmitting reference signals used for measuring and estimating the rotational offset(s).

With reference to antenna array configuration 300-a of FIG. 3A, as previously discussed orientation between the first antenna array 320 and the second antenna array 305 may be misaligned along the linear access (for example, along the Z access corresponding to the linear offset) as well as including one or more rotational offsets (e.g., rotational angle offsets). The rotational offsets may correspond to the first antenna array 320 being rotated about the Z axis such that the antenna elements pairs are not aligned. For example, antenna element 310-a of the second antenna array 305 may be misaligned with respect to the corresponding antenna elements 325-a of the first antenna array 320. Similarly, antenna elements 310-b may be misaligned with reference to antenna element 325-b, antenna element 310-c may be misaligned with reference to antenna elements 325-c, and antenna elements 310-d may be misaligned with reference to antenna elements 325-d. Such misalignment may also be based on the planer face of the first antenna array 320 being non-planar with respect to the planer face of the second antenna array 305. That is, the first antenna array 320 may be positioned in a manner inconsistent with the antenna array placement 315.

Aspects are described herein for determining the rotational offsets in terms of rotational angle offsets (for example, rotational angles along one or more axis at the first antenna array 320 relative to the second antenna array 305). As described herein, various types of coordinate systems may be used to estimate the offsets, including the rotational offsets. As such, the rotational offsets may be represented as an angle (for example, in degrees) or in another type of rotational measurement representation.

Turning to the antenna array configuration 300-b of FIG. 3B, aspects of the described techniques may also include the second device transmitting a second plurality of reference signals to a first plurality of antennas of the first antenna array 320 and from a second plurality of antennas of the second antenna array 305. For example, a reference signal may be transmitted from antenna element 310-a to antenna element 325-a, another reference signal may be transmitted from antenna element 310-b to antenna element 325-b, another reference signal may be transmitted from antenna element 310-c to antenna element 325-c, and another reference signal may be transmitted from antenna element 310-d to antenna elements 325-d. Accordingly, the first plurality of antennas in this example may be located at noncentral locations of the first antenna array, such as along the peripheral edge of each antenna array.

The first device may receive the second plurality reference signals and measure a corresponding second plurality of phases corresponding to the second probably reference signals. That is, the first device may measure the phase of the reference signal transmitted from antenna element 310-a to antenna element 325-a, and so forth. Based on the second plurality of phases, the first device may estimate the rotational offset(s) (e.g., angle(s)) between the first antenna array 320 and the second antenna array 305. In some aspects, estimating the rotational offset(s) may be based on adjusting for the linear offset. That is, the second device may apply the adjustments to the metric(s) if transmitting the second set of reference signals in order to eliminate or otherwise pre-compensate for the linear offset misalignment.

Accordingly, with the origin of the receive plain coordinate on the transmitting plane Z axis adjusted for, only the rotational offsets RLF to be determined. This may be illustrated as according to Equation (11) below:

$$\begin{bmatrix} x \\ y \\ z \end{bmatrix} = \begin{bmatrix} 0 \\ 0 \\ z_0 \end{bmatrix} + \begin{bmatrix} \cos\alpha\cos\beta & \cos\alpha\sin\beta\sin\gamma - \sin\alpha\cos\gamma & \cos\alpha\sin\beta\cos\gamma + \sin\alpha\sin\gamma \\ \sin\alpha\cos\beta & \sin\alpha\sin\beta\sin\gamma + \cos\alpha\cos\gamma & \sin\alpha\sin\beta\cos\gamma - \cos\alpha\sin\gamma \\ -\sin\beta & \cos\beta\sin\gamma & \cos\beta\cos\gamma \end{bmatrix} \begin{bmatrix} x' \\ y' \\ z' \end{bmatrix} \quad (11)$$

An intuitive approach to this may be, if $\beta=0$ and $\gamma=0$, the following four distances may be considered equal: distance [receive plane ($d'_x$, 0,0) and transmit plane ($d_x$, 0,0)], distance [receive plane ($-d'_x$, 0,0) and transmit plane ($-d_x$, 0,0)], distance [receive plane (0, $d'_y$, 0) and transmit plane (0, $d_y$, 0)], and distance [receive plane (0, $-d'_y$, 0) and transmit plane (0, $-d_y$, 0)].

Rotational offset compensation if symmetric transmit plane and receive plane channel reciprocity may be based on the correlation between the antenna elements of the antenna arrays. For example, if there are the same number of transmit plane and receive plane units (for example, antenna elements), and each unit in the transmit plane (x,y,0) is paired with a corresponding receive plane unit (x',y',z'), then the following may be calculated: the distance between (x,y,z) and (x',y',z')—the distance between (0,0,0) (transmit plane) and (0,0,0)(receive plane). The distance/phase difference can be fed back by the first device; or if channel reciprocity is assumed, this can be estimated directly by the second device by transmissions from the first device. However, other scenarios may not have either symmetry or reciprocity.

In this situation, the distance [receive plane ($d'_x$, 0,0) and transmit plane $$(d_x, 0, 0)] = \sqrt{(\cos\alpha\cos\beta d'_x - d_x)^2 + (\sin\alpha\cos\beta d'_x)^2 + (\sin\beta d'_x)^2 - 2\sin\beta d'_x z_0 + z_0^2} \approx$$
$$z_0 + \frac{(\cos\alpha\cos\beta d'_x - d_x)^2 + (\sin\alpha\cos\beta d'_x)^2 + (\sin\beta d'_x)^2 - 2\sin\beta d'_x z_0}{2z_0}$$

and the distance [receive plane ($-d'_x$, 0,0) and transmit plane $$(-d_x, 0, 0)] = \sqrt{(-\cos\alpha\cos\beta d'_x + d_x)^2 + (-\sin\alpha\cos\beta d'_x)^2 + (\sin\beta d'_x + z_0)^2} \approx$$
$$z_0 + \frac{(\cos\alpha\cos\beta d'_x - d_x)^2 + (\sin\alpha\cos\beta d'_x)^2 + (\sin\beta d'_x)^2 + 2\sin\beta d'_x z_0}{2z_0},$$

the distance [receive plane (0, $d'_y$, 0) and transmit plane $$(0, d_y, 0)] = \sqrt{\begin{aligned}&[(\cos\alpha\sin\beta\sin\gamma - \sin\alpha\cos\gamma)d'_y]^2 + \\ &[(\sin\alpha\sin\beta\sin\gamma + \cos\alpha\cos\gamma)d'_y - d_y]^2 + (\cos\beta\sin\gamma d'_y + z_0)^2\end{aligned}} \approx$$

-continued $$z_0 + \frac{[(\cos\alpha\sin\beta\sin\gamma - \sin\alpha\cos\gamma)d'_y]^2 +}{2z_0},$$
$$\frac{[(\sin\alpha\sin\beta\sin\gamma + \cos\alpha\cos\gamma)d'_y - d_y]^2 + (\cos\beta\sin\gamma d'_y)^2 + 2\cos\beta\sin\gamma d'_y z_0}{2z_0},$$

and the distance[receive plane $(0, -d'_y, 0)$ and transmit plane $(0, -d_y, 0)] =$ $$\sqrt{[-(\cos\alpha\sin\beta\sin\gamma - \sin\alpha\cos\gamma)d'_y]^2 + [-(\sin\alpha\sin\beta\sin\gamma + \cos\alpha\cos\gamma)d'_y + d_y]^2 + (-\cos\beta\sin\gamma d'_y + z_0)^2} \approx$$

$$z_0 + \frac{[(\cos\alpha\sin\beta\sin\gamma - \sin\alpha\cos\gamma)d'_y]^2 +}{2z_0}$$
$$\frac{[(\sin\alpha\sin\beta\sin\gamma + \cos\alpha\cos\gamma)d'_y - d_y]^2 + (\cos\beta\sin\gamma d'_y)^2 - 2\cos\beta\sin\gamma d'_y z_0}{2z_0}$$

Additionally, further steps may include {distance [receive plane $(d'_x, 0,0)$ and transmit plane $(d_x, 0,0)$]–distance [receive plane $0,0)$ and transmit plane $$(-d_x, 0, 0)]\} \approx \frac{-2\sin\beta d'_x z_0}{z_0} \approx 2d'_x \sin\beta \propto \sin\beta,$$

the {distance [receive plane $(0, d'_y, 0)$ and transmit plane $(0, d_y, 0)$]–distance [receive plane $(0, -'_y, 0)$ and transmit plane $$(0, -d_y, 0)]\} \approx \frac{2\cos\beta\sin\gamma d'_y z_0}{z_0} \approx 2d'_y \cos\beta\sin\gamma \propto \cos\beta\sin\gamma.$$

The asymmetry between $\beta$ and $\gamma$ may come from the 3D rotation matrix in which $(\alpha, \beta, \gamma)$ with respect to the z-, y- and x-axis of the transmit plane coordinates, in that order. Accordingly, $\beta, \gamma$ can be solved; then $\alpha$ can be solved by any one or multiple of the four distances above. Again, reference signals (for example, the second plurality of reference signals) are needed for the transmit plane units (for example, the antenna elements 310 of the second antenna array 305) may be used for phase measurements, wherein the units are at the four corners or peripheral edges of the transmit plane or both.

Accordingly, the first device may measure the second plurality of phases and transmit or otherwise convey an indication of the rotational offset(s) (for example, the rotational offset(s) or the second plurality of phases or both) to the second device. The second device may adjust or otherwise modify metric(s) used for communications between the first antenna array 320 and the second antenna array 305 based on the indication.

In some aspects, this may be as according to Equation (12) below:

$$\begin{bmatrix} x'' \\ y'' \\ z'' \end{bmatrix} = \qquad (12)$$

$$\begin{bmatrix} \cos\alpha\cos\beta & \cos\alpha\sin\beta\sin\gamma - \sin\alpha\cos\gamma & \cos\alpha\sin\beta\cos\gamma + \sin\alpha\sin\gamma \\ \sin\alpha\cos\beta & \sin\alpha\sin\beta\sin\gamma + \cos\alpha\cos\gamma & \sin\alpha\sin\beta\cos\gamma - \cos\alpha\sin\gamma \\ -\sin\beta & \cos\beta\sin\gamma & \cos\beta\cos\gamma \end{bmatrix}^{-1} \begin{bmatrix} x \\ y \\ 0 \end{bmatrix}$$

For each transmitter at $(x,y,0)$ in the transmit plane: this may include finding the corresponding $(x'',y'',z'')$ at the rotated transmit plane according to the formula, in which the matrix inverse can be found in closed form by reversing the rotation angles. The propagation path length may be found using: $\text{sign}(z'')\sqrt{(x-x'')^2+(y-y'')^2+z''^2}$. Pre-compensating a phase may be equal to $$-\frac{2\pi}{\lambda}\text{sign}(z'')\sqrt{(x-x'')^2 + (y-y'')^2 + z''^2}.$$

In multiple steps discussed herein there is evaluation evaluate (for example, comparison) of distance, in which the evaluation of distance may be implemented by evaluation of the measured phase(s). The phase may have a periodicity of $2\pi$, but it may be assumed that such ambiguity has been removed based on the techniques discussed herein.

As also discussed herein, the accuracy of the phase measurements (which are used to estimate the distance between each antenna element) is important for accuracy. This may include assuming the received signal at one receive plane from the transmit plane, after coherent integration in time, is in the form $y=Ae^{j\theta}+z$, in which A is the signal amplitude and z $(z=z_r+jz_i)$ is noise with $z_r$ and $z_i$ as the real and imaginary parts, respectively, and a total variance $\sigma^2$. In some aspects, $y=\text{Real}(y)+j\text{Imag}(y)=A\cos(\theta)+jA\sin(\theta)+z_r+jz_i$ and $$\hat{\theta} = \text{Phase}(y) = \arctan(y) = \arctan\left(\frac{A\sin(\theta) + z_i}{A\cos(\theta) + z_r}\right).$$

At high SINR, it can be assumed:

$$E[\hat{\theta}] \cong \theta, \text{Var}[\hat{\theta}] \cong \text{Var}\left[\arctan\left(\frac{A\sin(\theta) + z_i}{A\cos(\theta) + z_r}\right)\right] \cong$$

$$\left[\frac{1}{1+E\left\{\left|\frac{A\sin(\theta)+zi}{A\cos(\theta)+z_r}\right|^2\right\}}\right]^2 \text{var}\left(\frac{A\sin(\theta)+z_i}{A\cos(\theta)+z_r}\right) \cong$$

$$\left[\frac{1}{1+\tan(\theta)^2}\right]^2 E\left|\frac{A\sin(\theta)+z_i}{A\cos(\theta)+z_r} - \frac{A\sin(\theta)}{A\cos(\theta)}\right|^2 \cong$$

$$\left[\frac{1}{1+\tan(\theta)^2}\right]^2 E\left|\frac{z_i\cos(\theta)+z_r\sin(\theta)}{A\cos(\theta)}\right|^2 =$$

-continued $$\left[\frac{1}{1+\tan(\theta)^2}\right]^2 \frac{\frac{\sigma^2}{2}[1+\tan(\theta)^2]}{|A|^2} = \frac{1}{2SNR[1+\tan(\theta)^2]}.$$

At a high SINR, $E[\hat{\theta}] \cong \theta$, $$\text{Var}[\hat{\theta}] \cong \frac{1}{2SNR[1+\tan(\theta)^2]}.$$

The var $[\hat{\theta}]$ may be small if $\tan(\theta) \to \infty$, but this does not pose any practical problem because the singularity of $\tan(\theta)$ at $\theta = \pi/2$ and $\theta = 3\pi/2$ can be mitigated. To evaluate (for example, compare) two phases at two receive plane units, the phase difference which can be accurately estimate is around $$\frac{1}{\sqrt{SNR}}.$$

The phase difference could be small due to the very nature of par-axial approximation. Then the coherent integration may be used to boost SNR. No array gain is possible because no beamforming is used at this stage. Phase noise may be mitigated, or non-coherent integration can be used to further increase the phase difference evaluation (for example, comparison).

Accordingly, the first or second devices (or both) may determine the noise level for the channel between the first antenna array 320 and the second antenna array 305, which may determine the phase accuracy for the measurements, at least to some degree.

Moreover, there may be a timing aspect with respect to the described techniques. For example, the phase noise may hamper any phase evaluation (for example, comparison) of the same receive plane unit across time. Therefore, aspects of the described techniques maintain such comparison within the "coherence time" due to phase noise. An alternative is to avoid phase evaluation across time: evaluation across time can be replaced by evaluation across two receive units at the same time. If the phase ambiguity is an issue, then the evaluation (for example, comparison) may be made at two receive plane units that are close enough to each other for phase-deambiguity to work (for example, dense phase sampling). Phase noise may still have an impact on limiting the coherent integration time. Accordingly, the first device may evaluate the two or more phases measured for the first or second sets (or both) of reference signals based on the reference signals being communicated within a time threshold (for example, the coherence time).

Figure 4:
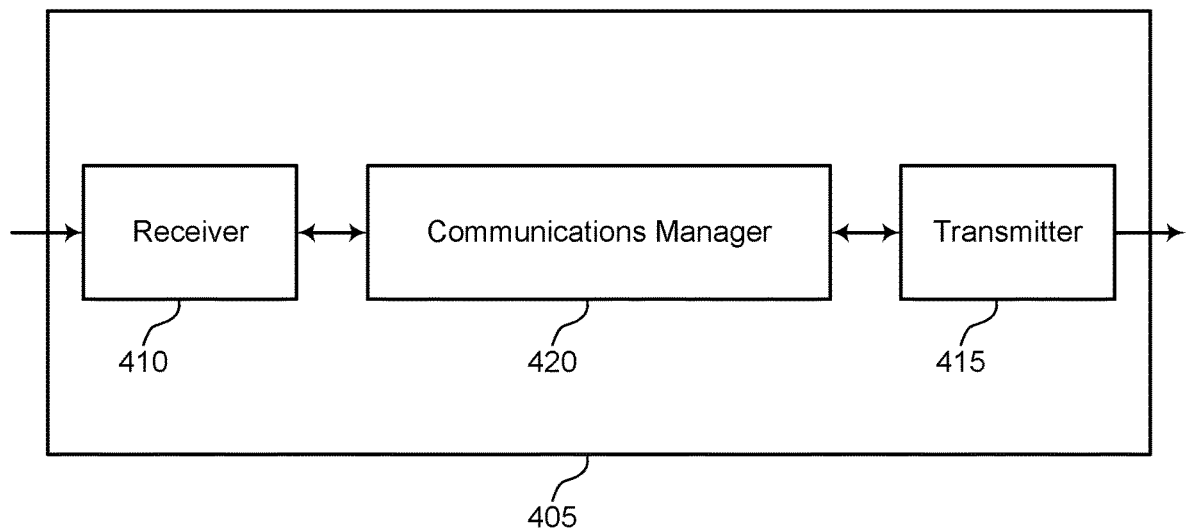
FIGS. 4 and 5 show block diagrams of devices that support phase pre-compensation for misalignment in accordance with aspects of the present disclosure.

FIG. 4 shows a block diagram of a device 405 that supports phase pre-compensation for misalignment in accordance with aspects of the present disclosure. The device 405 may be an example of aspects of a UE 115 or a base station 105 as described herein. The device 405 may include a receiver 410, a transmitter 415, and a communications manager 420. The device 405 can be implemented, at least in part, by one or both of a modem and a processor. Each of these components may be in communication with one another (for example, via one or more buses).

The receiver 410 may provide a means for receiving information such as packets, user data, control information, or any combination thereof associated with various information channels (for example, control channels, data channels, information channels related to phase pre-compensation for misalignment). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (for example, control channels, data channels, information channels related to phase pre-compensation for misalignment). In some examples, the transmitter 415 may be co-located with a receiver 410 in a transceiver component. The transmitter 415 may utilize a single antenna or a set of multiple antennas.

The communications manager 420, the receiver 410, the transmitter 415, or various combinations thereof or various components thereof may be examples of means for performing various aspects of phase pre-compensation for misalignment as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (for example, in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

Additionally or alternatively, in some examples, the communications manager 420, the receiver 410, the transmitter 415, or various combinations or components thereof may be implemented in code (for example, as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (for example, configured as or otherwise supporting a means for performing the functions described in the present disclosure).

In some examples, the communications manager 420 may be configured to perform various operations (for example, receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a device in accordance with examples as disclosed herein. For example, the communications manager 420 may be configured as or otherwise support a means for transmitting, from a first antenna of a first antenna array of the first device to a second antenna of a second antenna array of a second device, a first set of reference signals that includes one or more reference signals. The communications manager 420 may be configured as or otherwise support a means for transmitting, from a first set of multiple antennas of the first antenna array to a second set of multiple antennas of the second antenna array, a second set of multiple reference signals. The communications manager 420 may be configured as or otherwise support a means for receiving, from the second device, an indication based on a linear offset and one or more rotational offsets estimated by the second device associated with the first set of reference signals and the second set of multiple reference signals. The communications manager 420 may be configured as or otherwise support a means for communicating with the second device using the first antenna array is based on the indication.

Additionally or alternatively, the communications manager 420 may support wireless communication at a first device in accordance with examples as disclosed herein. For example, the communications manager 420 may be configured as or otherwise support a means for receiving, at a first antenna of a first antenna array of the first device from a second antenna of a second antenna array of a second device, a first set of reference signals that includes one or more reference signals. The communications manager 420 may be configured as or otherwise support a means for measuring, basing at least in part on receiving the first set of reference signals, one or more first phases for the first set of reference signals. The communications manager 420 may be configured as or otherwise support a means for estimating, basing at least in part on the one or more first phases for the first set of reference signals, a linear offset between the first antenna array and the second antenna array. The communications manager 420 may be configured as or otherwise support a means for receiving, at a first set of multiple antennas of the first antenna array of the first device from a second set of multiple antennas of the second antenna array of the second device, a second set of multiple reference signals. The communications manager 420 may be configured as or otherwise support a means for measuring, basing at least in part on receiving the second set of multiple reference signals, a second set of multiple phases of each of the second set of multiple reference signals. The communications manager 420 may be configured as or otherwise support a means for estimating, basing at least in part on the second set of multiple phases of the second set of multiple reference signals, one or more rotational offsets between the first antenna array and the second antenna array. The communications manager 420 may be configured as or otherwise support a means for transmitting, to the second device, an indication based on the linear offset and the one or more rotational offsets.

By including or configuring the communications manager 420 in accordance with examples as described herein, the device 405 (for example, a processor controlling or otherwise coupled to the receiver 410, the transmitter 415, the communications manager 420, or a combination thereof) may support techniques for an iterative approach to isolate and compensate for linear offset and rotation angle offsets associated with misalignment between planar antenna arrays comprising multiple antenna elements.

Figure 5:
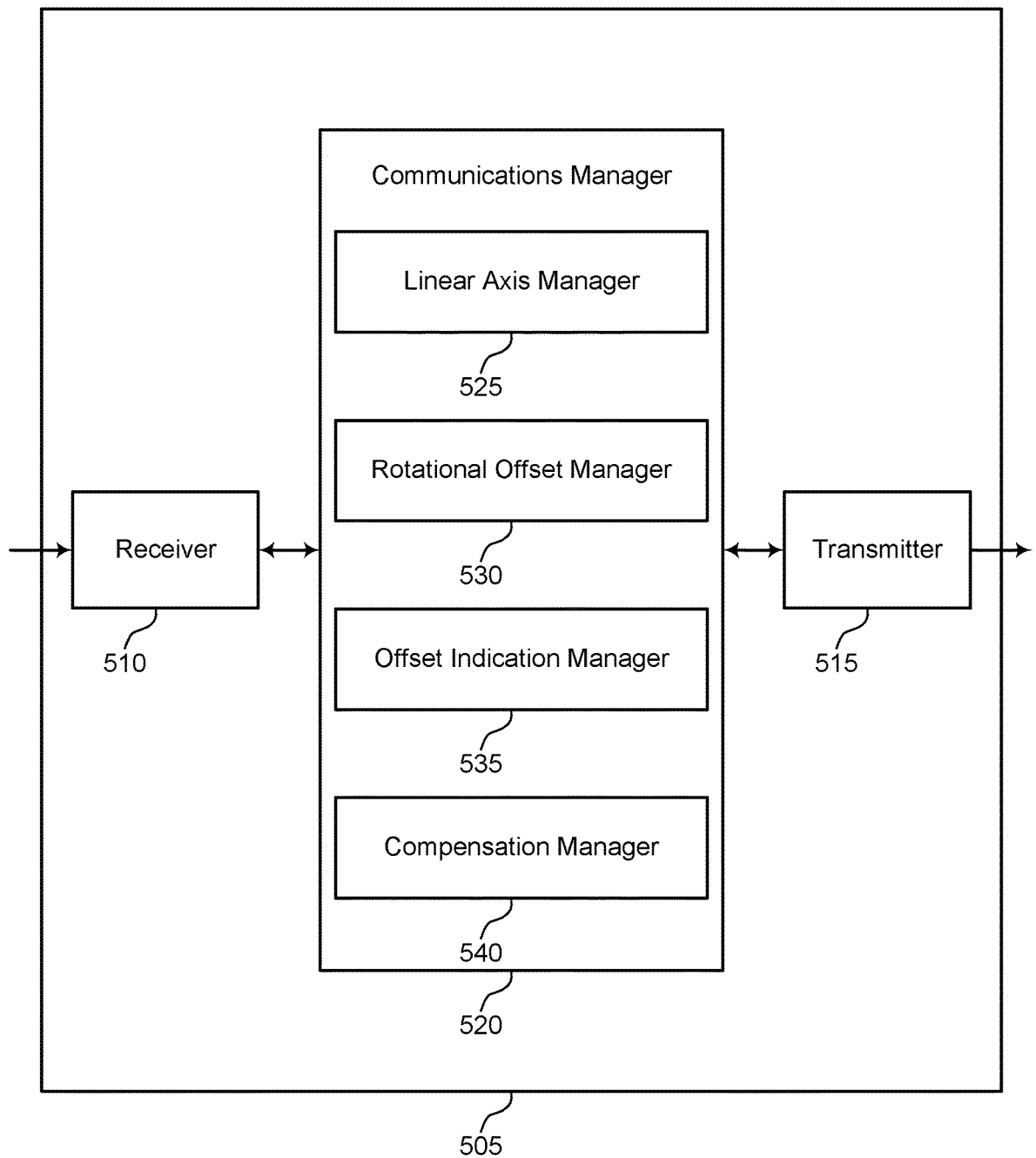

FIG. 5 shows a block diagram of a device 505 that supports phase pre-compensation for misalignment in accordance with aspects of the present disclosure. The device 505 may be an example of aspects of a device 405, a UE 115, or a base station 105 as described herein. The device 505 may include a receiver 510, a transmitter 515, and a communications manager 520. The device 505 can be implemented, at least in part, by one or both of a modem and a processor. Each of these components may be in communication with one another (for example, via one or more buses).

The receiver 510 may provide a means for receiving information such as packets, user data, control information, or any combination thereof associated with various information channels (for example, control channels, data channels, information channels related to phase pre-compensation for misalignment). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (for example, control channels, data channels, information channels related to phase pre-compensation for misalignment). In some examples, the transmitter 515 may be co-located with a receiver 510 in a transceiver component. The transmitter 515 may utilize a single antenna or a set of multiple antennas.

The device 505, or various components thereof, may be an example of means for performing various aspects of phase pre-compensation for misalignment as described herein. For example, the communications manager 520 may include a linear axis manager 525, a rotational offset manager 530, an offset indication manager 535, a compensation manager 540, or any combination thereof. The communications manager 520 may be an example of aspects of a communications manager 420 as described herein. In some examples, the communications manager 520, or various components thereof, may be configured to perform various operations (for example, receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a device in accordance with examples as disclosed herein. The linear axis manager 525 may be configured as or otherwise support a means for transmitting, from a first antenna of a first antenna array of the first device to a second antenna of a second antenna array of a second device, a first set of reference signals that includes one or more reference signals. The rotational offset manager 530 may be configured as or otherwise support a means for transmitting, from a first set of multiple antennas of the first antenna array to a second set of multiple antennas of the second antenna array, a second set of multiple reference signals. The offset indication manager 535 may be configured as or otherwise support a means for receiving, from the second device, an indication based on a linear offset and one or more rotational offsets estimated by the second device associated with the first set of reference signals and the second set of multiple reference signals. The compensation manager 540 may be configured as or otherwise support a means for communicating with the second device using the second antenna array is based on the indication.

Additionally or alternatively, the communications manager 520 may support wireless communication at a first device in accordance with examples as disclosed herein. The linear axis manager 525 may be configured as or otherwise support a means for receiving, at a first antenna of a first antenna array of the first device from a second antenna of a second antenna array of a second device, a first set of reference signals that includes one or more reference signals. The linear axis manager 525 may be configured as or otherwise support a means for measuring, based on receiving the first set of reference signals, one or more first phases for the first set of reference signals. The linear axis manager 525 may be configured as or otherwise support a means for estimating, based on the one or more first phases for the first set of reference signals, a linear offset between the first antenna array and the second antenna array. The rotational offset manager 530 may be configured as or otherwise support a means for receiving, at a first set of multiple antennas of the first antenna array of the first device from a second set of multiple antennas of the second antenna array of the second device, a second set of multiple reference signals. The rotational offset manager 530 may be configured as or otherwise support a means for measuring, based on receiving the second set of multiple reference signals, a second set of multiple phases of each of the second set of multiple reference signals. The rotational offset manager 530 may be configured as or otherwise support a means for estimating, based on the second set of multiple phases of the second set of multiple reference signals, one or more rotational offsets between the first antenna array and the second antenna array. The rotational offset manager 530 may be configured as or otherwise support a means for transmitting, to the second device, an indication based on the linear offset and the one or more rotational offsets.

Figure 6:
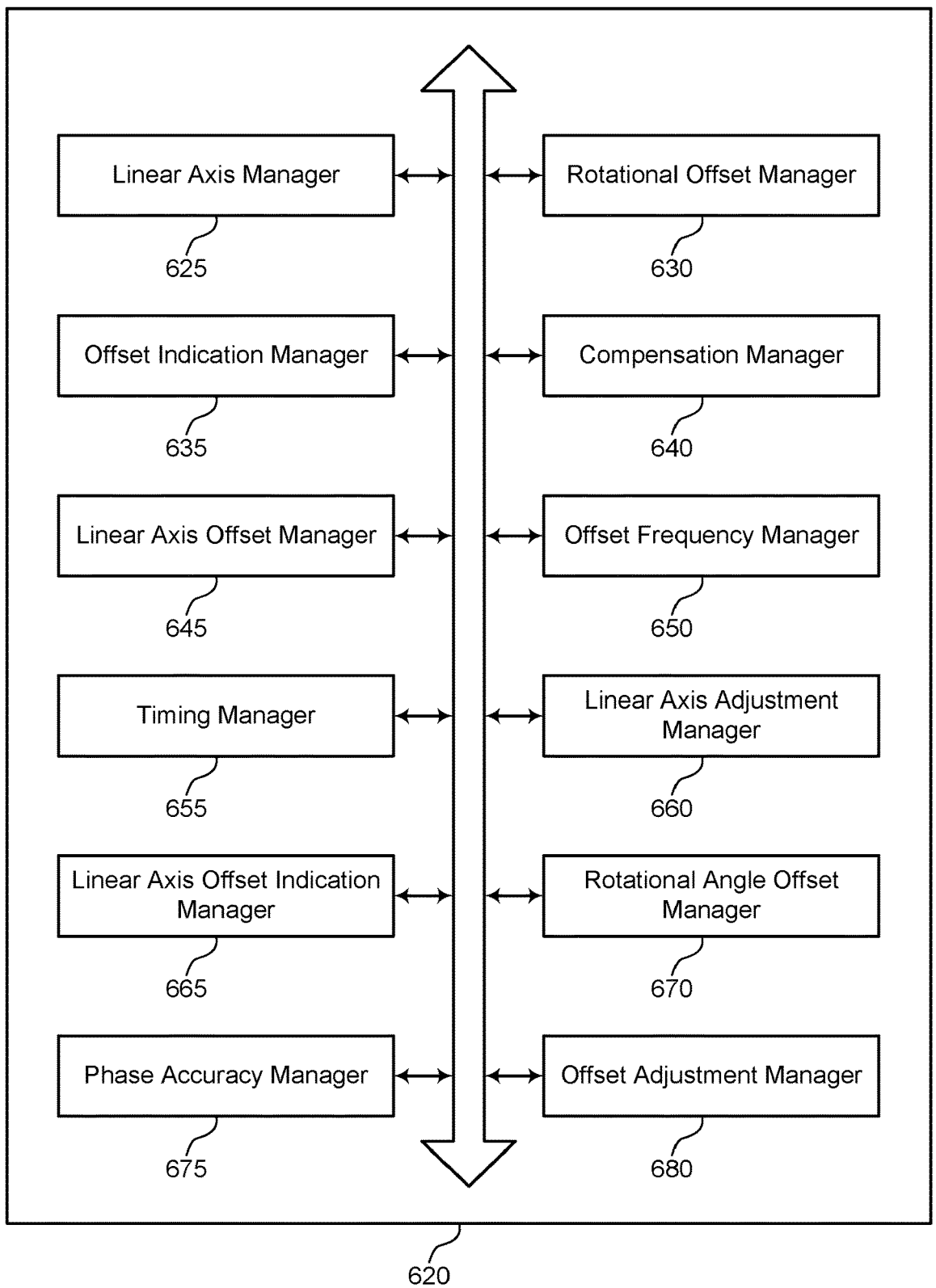
FIG. 6 shows a block diagram of a communications manager that supports phase pre-compensation for misalignment in accordance with aspects of the present disclosure.

FIG. 6 shows a block diagram of a communications manager 620 that supports phase pre-compensation for misalignment in accordance with aspects of the present disclosure. The communications manager 620 may be an example of aspects of a communications manager 420, a communications manager 520, or both, as described herein. The communications manager 620, or various components thereof, may be an example of means for performing various aspects of phase pre-compensation for misalignment as described herein. For example, the communications manager 620 may include a linear axis manager 625, a rotational offset manager 630, an offset indication manager 635, a compensation manager 640, a linear axis offset manager 645, an offset frequency manager 650, a timing manager 655, a linear axis adjustment manager 660, a linear axis offset indication manager 665, a rotational angle offset manager 670, a phase accuracy manager 675, an offset adjustment manager 680, or any combination thereof. Each of these components may communicate, directly or indirectly, with one another (for example, via one or more buses).

The communications manager 620 may support wireless communication at a first device in accordance with examples as disclosed herein. The linear axis manager 625 may be configured as or otherwise support a means for transmitting, from a first antenna of a first antenna array of the first device to a second antenna of a second antenna array of the second device, a first set of reference signals that includes one or more reference signals. The rotational offset manager 630 may be configured as or otherwise support a means for transmitting, from a first set of multiple antennas of the first antenna array to a second set of multiple antennas of the second antenna array, a second set of multiple reference signals. The offset indication manager 635 may be configured as or otherwise support a means for receiving, from the second device, an indication based on a linear offset and one or more rotational offsets estimated by the second device associated with the first set of reference signals and the second set of multiple reference signals. The compensation manager 640 may be configured as or otherwise support a means for communicating with the second device using the first antenna array based on indication.

In some examples, the linear axis offset manager 645 may be configured as or otherwise support a means for adjusting one or more metrics for communications between the first antenna array and the second antenna array based on the indication, wherein the communicating with the second device using the first antenna array is based at least in part on adjusting the one or more metrics.

In some examples, the linear axis offset manager 645 may be configured as or otherwise support a means for receiving the indication based on the linear offset before transmitting the second set of multiple reference signals, where transmitting the second set of multiple reference signals is based on the indication.

In some examples, the linear axis offset manager 645 may be configured as or otherwise support a means for adjusting, before transmitting the second set of multiple reference signals, a first subset of one or more metrics based the indication.

In some examples, the offset frequency manager 650 may be configured as or otherwise support a means for transmitting the first set of reference signals at a first frequency. In some examples, the offset frequency manager 650 may be configured as or otherwise support a means for transmitting the second set of multiple reference signals at a second frequency, the first frequency within a frequency threshold of the second frequency.

In some examples, the indication includes information associated with one or more first phases for the first set of reference signals measured by the second device, the linear offset, a second set of multiple phases of the second set of multiple reference signals measured by the second device, the one or more rotational offsets, or any combination thereof.

In some examples, the timing manager 655 may be configured as or otherwise support a means for transmitting the first set of reference signals and the second set of multiple reference signals within a time threshold, where each of the linear offset and the one or more rotational offsets is based on the time threshold. In some examples, the first antenna is located at a central location of the first antenna array and the first set of multiple antennas are located at a non-central location of the first antenna array.

Additionally or alternatively, the communications manager 620 may support wireless communication at a first device in accordance with examples as disclosed herein. In some examples, the linear axis manager 625 may be configured as or otherwise support a means for receiving, at a first antenna of a first antenna array of the first device from a second antenna of a second antenna array of a second device, a first set of reference signals that includes one or more reference signals. In some examples, the linear axis manager 625 may be configured as or otherwise support a means for measuring, based on receiving the first set of reference signals, one or more first phases for the first set of reference signals. In some examples, the linear axis manager 625 may be configured as or otherwise support a means for estimating, based on the one or more first phases for the first set of reference signals, a linear offset between the first antenna array and the second antenna array. In some examples, the rotational offset manager 630 may be configured as or otherwise support a means for receiving, at a first set of multiple antennas of the first antenna array of the first device from a second set of multiple antennas of the second antenna array of the second device, a second set of multiple reference signals. In some examples, the rotational offset manager 630 may be configured as or otherwise support a means for measuring, based on receiving the second set of multiple reference signals, a second set of multiple phases of each of the second set of multiple reference signals. In some examples, the rotational offset manager 630 may be configured as or otherwise support a means for estimating, based on the second set of multiple phases of the second set of multiple reference signals, one or more rotational offsets between the first antenna array and the second antenna array. In some examples, the rotational offset manager 630 may be configured as or otherwise support a means for transmitting, to the second device, an indication based on the linear offset and the one or more rotational offsets.

In some examples, the linear axis adjustment manager 660 may be configured as or otherwise support a means for adjusting, before receiving the second set of multiple reference signals, a first subset of one or more metrics associated with communications between the first antenna array and the second antenna array based on the linear offset.

In some examples, the linear axis offset indication manager 665 may be configured as or otherwise support a means for transmitting, before receiving the second set of multiple reference signals, the indication of the linear offset.

In some examples, to support estimating the linear offset, the linear axis offset manager 645 may be configured as or otherwise support a means for measuring, based at least in part on the one or more first phases, a difference between a first linear distance between the first antenna and the second antenna and a second linear distance between the first antenna of the first antenna array and a third antenna of the second antenna array, wherein estimating the linear offset is based at least in part on the difference. In some examples, to support estimating the linear offset, the linear axis offset manager 645 may be configured as or otherwise support a means for comparing the distance to a physical distance between a center of the first antenna array and a center of the second antenna array. In some examples, the first linear distance and the second linear distance identifies a horizontal distance along a horizontal axis and a vertical distance along a vertical axis, the horizontal axis being perpendicular to the plane of the second antenna array and the vertical axis being along a vertical plane of the second antenna array.

In some examples, the linear axis offset manager 645 may be configured as or otherwise support a means for receiving the first set of reference signals at a first frequency. In some examples, the linear axis offset manager 645 may be configured as or otherwise support a means for receiving the second set of multiple reference signals at a second frequency, the first frequency within a frequency threshold of the second frequency.

In some examples, to support estimating the one or more rotational offsets, the rotational angle offset manager 670 may be configured as or otherwise support a means for estimating the one or more rotational offsets based on adjusting the position of the first antenna array for the linear offset.

In some examples, the phase accuracy manager 675 may be configured as or otherwise support a means for determining a phase accuracy associated with the first phase, the second set of multiple phases, or both, where the adjusting is based on the phase accuracy.

In some examples, the phase accuracy manager 675 may be configured as or otherwise support a means for determining a noise level for a channel between the first antenna array and the second antenna array, where the phase accuracy is based on the noise level for the channel.

In some examples, the indication includes information associated with the one or more first phases for the first set of reference signals, the linear offset, the second set of multiple phases for the second set of multiple reference signals, the one or more rotational offsets, or any combination thereof.

In some examples, the offset adjustment manager 680 may be configured as or otherwise support a means for adjusting one or more metrics for communications between the first antenna array and the second antenna array based on the linear offset and the one or more rotational offsets, wherein the communicating with the second device using the first antenna array is based at least in part on adjusting the one or more metrics.

In some examples, the timing manager 655 may be configured as or otherwise support a means for comparing two or more of phases measured for the first set of reference signals, the second set of multiple of reference signals, or both, based on first set of reference signals, the second set of multiple reference signals, or both, being received within a time threshold, where estimating the linear offset, the one or more rotational offsets, or both are based on the two or more of phases.

In some examples, the first antenna is located at a central location of the first antenna array and the first set of multiple antennas are located at a non-central location of the first antenna array.

Figure 7:
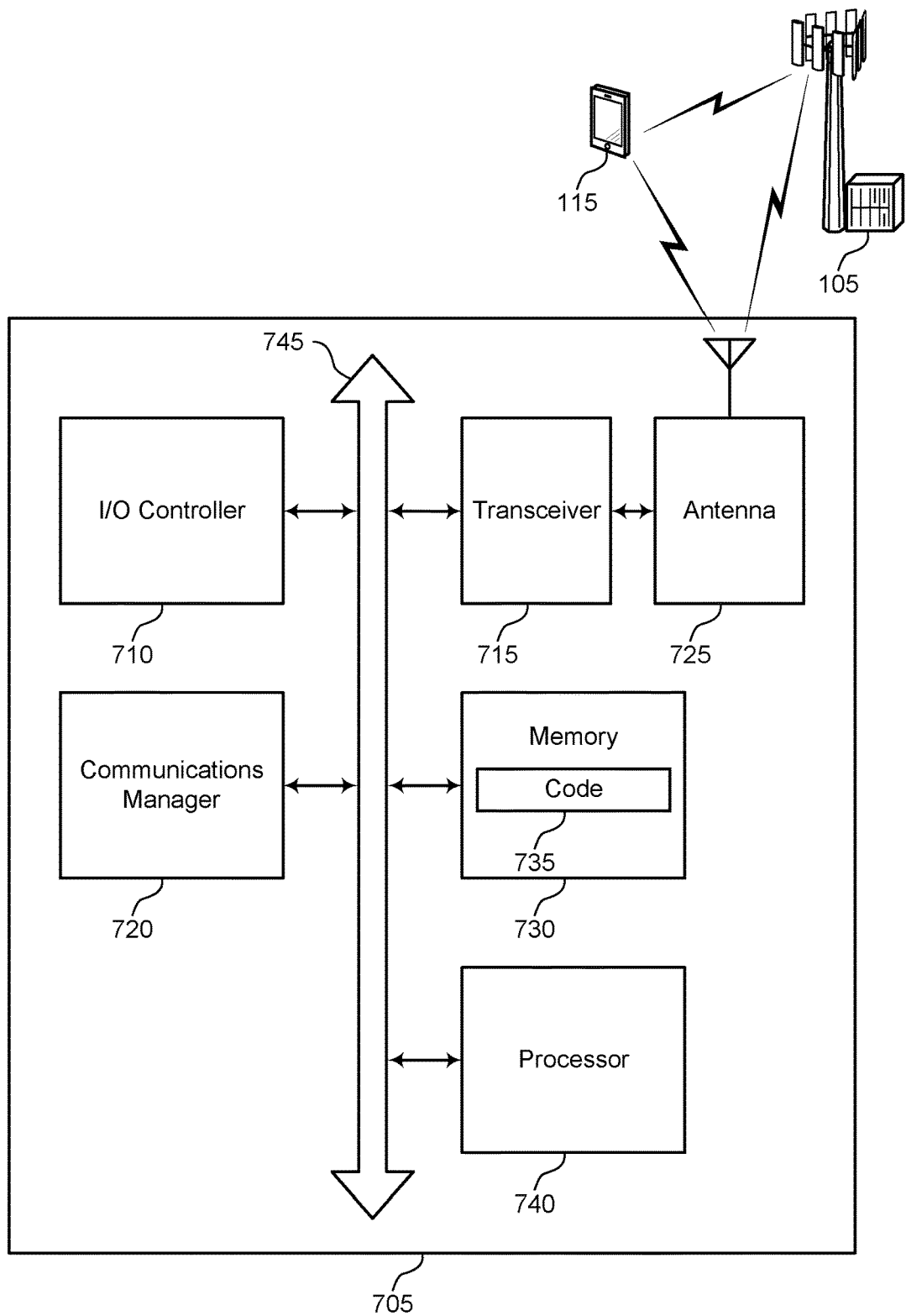
FIG. 7 shows a diagram of a system including a user equipment (UE) that supports phase pre-compensation for misalignment in accordance with aspects of the present disclosure.

FIG. 7 shows a diagram of a system including a device 705 that supports phase pre-compensation for misalignment in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (for example, operatively, communicatively, functionally, electronically, electrically) via one or more buses (for example, a bus 745).

The I/O controller 710 may manage input and output signals for the device 705. The I/O controller 710 may also manage peripherals not integrated into the device 705. In some examples, the I/O controller 710 may represent a physical connection or port to an external peripheral. In some examples, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some examples, the I/O controller 710 may be implemented as part of a processor, such as the processor 740. In some examples, a user may interact with the device 705 via the I/O controller 710 or via hardware components controlled by the I/O controller 710.

In some examples, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some examples, the code 735 may not be directly executable by the processor 740 but may cause a computer (for example, when compiled and executed) to perform functions described herein. In some examples, the memory 730 may contain, among other things, a basic I/O system (BIOS) which may control basic hardware or software operation such as the interaction with peripheral components or devices.

The processor 740 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 740 may be configured to operate a memory array using a memory controller. In some other cases, a memory controller may be integrated into the processor 740. The processor 740 may be configured to execute computer-readable instructions stored in a memory (for example, the memory 730) to cause the device 705 to perform various functions (for example, functions or tasks supporting phase pre-compensation for misalignment). For example, the device 705 or a component of the device 705 may include a processor 740 and memory 730 coupled to the processor 740, the processor 740 and memory 730 configured to perform various functions described herein.

The communications manager 720 may support wireless communication at a first device in accordance with examples as disclosed herein. For example, the communications manager 720 may be configured as or otherwise support a means for transmitting, from a first antenna of a first antenna array of the first device to a second antenna of a second antenna array of a second device, a first set of reference signals that includes one or more reference signals. The communications manager 720 may be configured as or otherwise support a means for transmitting, from a first set of multiple antennas of the first antenna array to a second set of multiple antennas of the second antenna array, a second set of multiple reference signals. The communications manager 720 may be configured as or otherwise support a means for receiving, from the second device, an indication based on a linear offset and one or more rotational offsets estimated by the second device associated with the first set of reference signals and the second set of multiple reference signals. The communications manager 720 may be configured as or otherwise support a means for communicating with the second device using the first antenna array based on the indication.

Additionally or alternatively, the communications manager 720 may support wireless communication at a first device in accordance with examples as disclosed herein. For example, the communications manager 720 may be configured as or otherwise support a means for receiving, at a first antenna of a first antenna array of the first device from a second antenna of a second antenna array of a second device, a first set of reference signals that includes one or more reference signals. The communications manager 720 may be configured as or otherwise support a means for measuring, basing at least in part on receiving the first set of reference signals, one or more first phases for the first set of reference signals. The communications manager 720 may be configured as or otherwise support a means for estimating, basing at least in part on the one or more first phases for the first set of reference signals, a linear offset between the first antenna array and the second antenna array. The communications manager 720 may be configured as or otherwise support a means for receiving, at a first set of multiple antennas of the first antenna array of the first device from a second set of multiple antennas of the second antenna array of the second device, a second set of multiple reference signals. The communications manager 720 may be configured as or otherwise support a means for measuring, basing at least in part on receiving the second set of multiple reference signals, a second set of multiple phases of each of the second set of multiple reference signals. The communications manager 720 may be configured as or otherwise support a means for estimating, basing at least in part on the second set of multiple phases of the second set of multiple reference signals, one or more rotational offsets between the first antenna array and the second antenna array. The communications manager 720 may be configured as or otherwise support a means for transmitting, to the second device, an indication based on the linear offset and the one or more rotational offsets.

By including or configuring the communications manager 720 in accordance with examples as described herein, the device 705 may support techniques for an iterative approach to isolate and compensate for linear offset and rotation offset offsets associated with misalignment between planar antenna arrays comprising multiple antenna elements.

In some examples, the communications manager 720 may be configured to perform various operations (for example, receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of phase pre-compensation for misalignment as described herein, or the processor 740 and the memory 730 may be otherwise configured to perform or support such operations.

Figure 8:
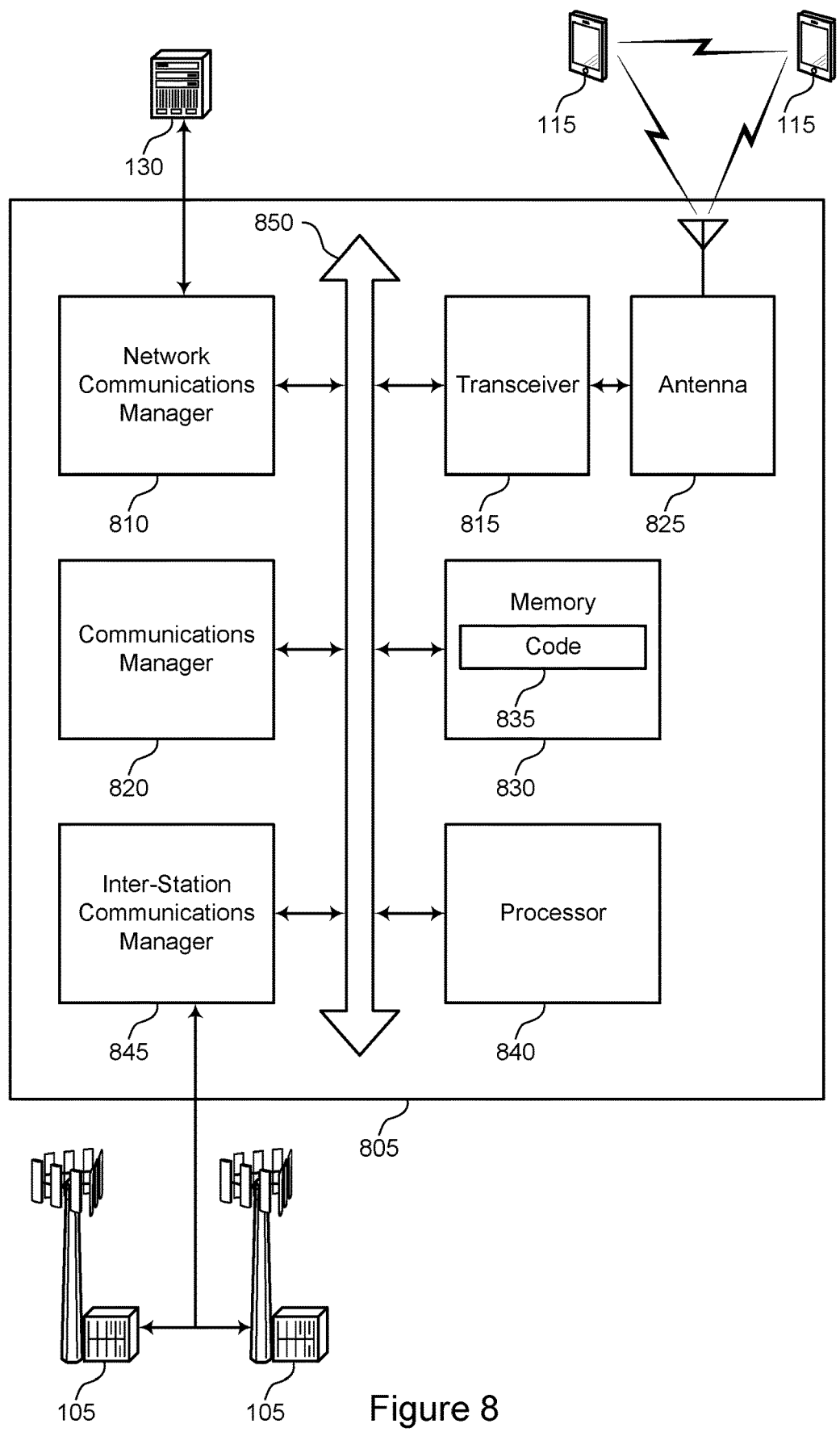
FIG. 8 shows a diagram of a system including a base station that supports phase pre-compensation for misalignment in accordance with aspects of the present disclosure.

FIG. 8 shows a diagram of a system including a device 805 that supports phase pre-compensation for misalignment in accordance with aspects of the present disclosure. The device 805 may be an example of or include the components of a device 405, a device 505, or a base station 105 as described herein. The device 805 may communicate wirelessly with one or more base stations 105, UEs 115, or any combination thereof. The device 805 may include components for bi-directional voice and data communications including components for transmitting and receiving communications, such as a communications manager 820, a network communications manager 810, a transceiver 815, an antenna 825, a memory 830, code 835, a processor 840, and an inter-station communications manager 845. These components may be in electronic communication or otherwise coupled (for example, operatively, communicatively, functionally, electronically, electrically) via one or more buses (for example, a bus 850).

The network communications manager 810 may manage communications with a core network 130 (for example, via one or more wired backhaul links). For example, the network communications manager 810 may manage the transfer of data communications for client devices, such as one or more UEs 115.

In some examples, the device 805 may include a single antenna 825. However, in some other cases the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 415, a transmitter 515, a receiver 410, a receiver 510, or any combination thereof or component thereof, as described herein.

The memory 830 may include RAM and ROM. The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some examples, the code 835 may not be directly executable by the processor 840 but may cause a computer (for example, when compiled and executed) to perform functions described herein. In some examples, the memory 830 may contain, among other things, a BIOS which may control basic hardware or software operation such as the interaction with peripheral components or devices.

The processor 840 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 840 may be configured to operate a memory array using a memory controller. In some other cases, a memory controller may be integrated into the processor 840. The processor 840 may be configured to execute computer-readable instructions stored in a memory (for example, the memory 830) to cause the device 805 to perform various functions (for example, functions or tasks supporting phase pre-compensation for misalignment). For example, the device 805 or a component of the device 805 may include a processor 840 and memory 830 coupled to the processor 840, the processor 840 and memory 830 configured to perform various functions described herein.

The inter-station communications manager 845 may manage communications with other base stations 105 and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communications network technology to provide communication between base stations 105.

The communications manager 820 may support wireless communication at a first device in accordance with examples as disclosed herein. For example, the communications manager 820 may be configured as or otherwise support a means for transmitting, from a first antenna of a first antenna array of the first device to a second antenna of a second antenna array of a second device, a first set of reference signals that includes one or more reference signals. The communications manager 820 may be configured as or otherwise support a means for transmitting, from a first set of multiple antennas of the first antenna array to a second set of multiple antennas of the second antenna array, a second set of multiple reference signals. The communications manager 820 may be configured as or otherwise support a means for receiving, from the second device, an indication based on a linear offset and one or more rotational offsets estimated by the second device associated with the first set of reference signals and the second set of multiple reference signals. The communications manager 820 may be configured as or otherwise support a means for communicating with the second device using the first antenna array is based on the indication.

Additionally or alternatively, the communications manager 820 may support wireless communication at a first device in accordance with examples as disclosed herein. For example, the communications manager 820 may be configured as or otherwise support a means for receiving, at a first antenna of a first antenna array of the first device from a second antenna of a second antenna array of a second device, a first set of reference signals that includes one or more reference signals. The communications manager 820 may be configured as or otherwise support a means for measuring, basing at least in part on receiving the first set of reference signals, one or more first phases for the first set of reference signals. The communications manager 820 may be configured as or otherwise support a means for estimating, basing at least in part on the one or more first phases for the first set of reference signals, a linear offset between the first antenna array and the second antenna array. The communications manager 820 may be configured as or otherwise support a means for receiving, at a first set of multiple antennas of the first antenna array of the first device from a second set of multiple antennas of the second antenna array of the second device, a second set of multiple reference signals. The communications manager 820 may be configured as or otherwise support a means for measuring, basing at least in part on receiving the second set of multiple reference signals, a second set of multiple phases of each of the second set of multiple reference signals. The communications manager 820 may be configured as or otherwise support a means for estimating, basing at least in part on the second set of multiple phases of the second set of multiple reference signals, one or more rotational offsets between the first antenna array and the second antenna array. The communications manager 820 may be configured as or otherwise support a means for transmitting, to the second device, an indication based on the linear offset and the one or more rotational offsets.

By including or configuring the communications manager 820 in accordance with examples as described herein, the device 805 may support techniques for an iterative approach to isolate and compensate for linear offset and rotation offset offsets associated with misalignment between planar antenna arrays comprising multiple antenna elements.

In some examples, the communications manager 820 may be configured to perform various operations (for example, receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of phase pre-compensation for misalignment as described herein, or the processor 840 and the memory 830 may be otherwise configured to perform or support such operations.

Figure 9:
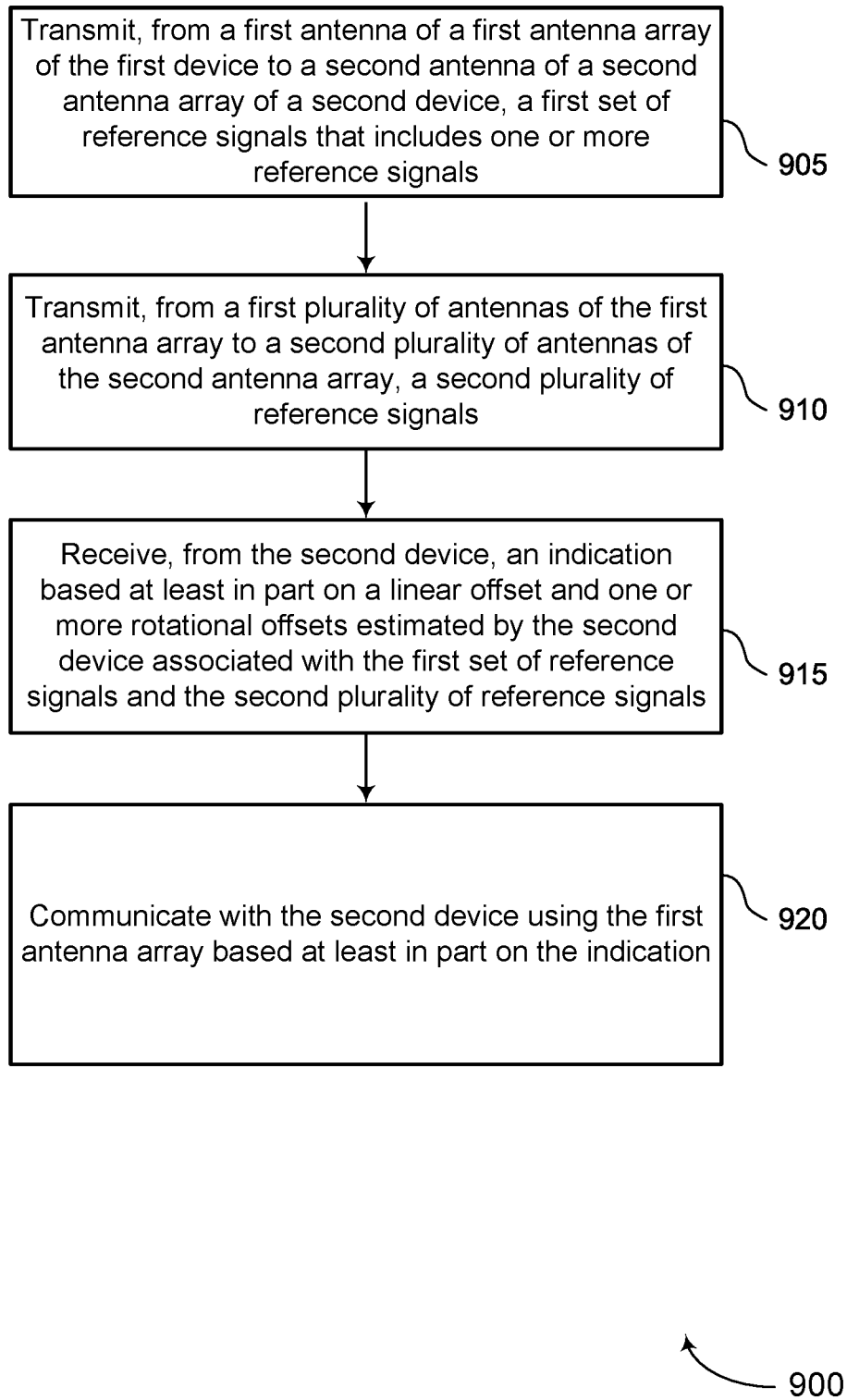
FIGS. 9 through 13 show flowcharts illustrating methods that support phase pre-compensation for misalignment in accordance with aspects of the present disclosure.

FIG. 9 shows a flowchart illustrating a method 900 that supports phase pre-compensation for misalignment in accordance with aspects of the present disclosure. The operations of the method 900 may be implemented by a UE or a base station or its components as described herein. For example, the operations of the method 900 may be performed by a UE 115 or a base station 105 as described with reference to FIGS. 1-8. In some examples, a UE or a base station may execute a set of instructions to control the functional elements of the UE or the base station to perform the described functions. Additionally or alternatively, the UE or the base station may perform aspects of the described functions using special-purpose hardware.

At 905, the method may include transmitting, from a first antenna of a first antenna array of the first device to a second antenna of a second antenna array of a second device, a first set of reference signals that includes one or more reference signals. The operations of 905 may be performed in accordance with examples as disclosed herein. In some examples, aspects of the operations of 905 may be performed by a linear axis manager 625 as described with reference to FIG. 6.

At 910, the method may include transmitting, from a first set of multiple antennas of the first antenna array to a second set of multiple antennas of the second antenna array, a second set of multiple reference signals. The operations of 910 may be performed in accordance with examples as disclosed herein. In some examples, aspects of the operations of 910 may be performed by a rotational offset manager 630 as described with reference to FIG. 6.

At 915, the method may include receiving, from the second device, an indication based on a linear offset and one or more rotational offsets estimated by the second device associated with the first set of reference signals and the second set of multiple reference signals. The operations of 915 may be performed in accordance with examples as disclosed herein. In some examples, aspects of the operations of 915 may be performed by an offset indication manager 635 as described with reference to FIG. 6.

At 920, the method may include communicating with the second device using the first antenna array is based on the indication. The operations of 925 may be performed in accordance with examples as disclosed herein. In some examples, aspects of the operations of 925 may be performed by a compensation manager 640 as described with reference to FIG. 6.

Figure 10:
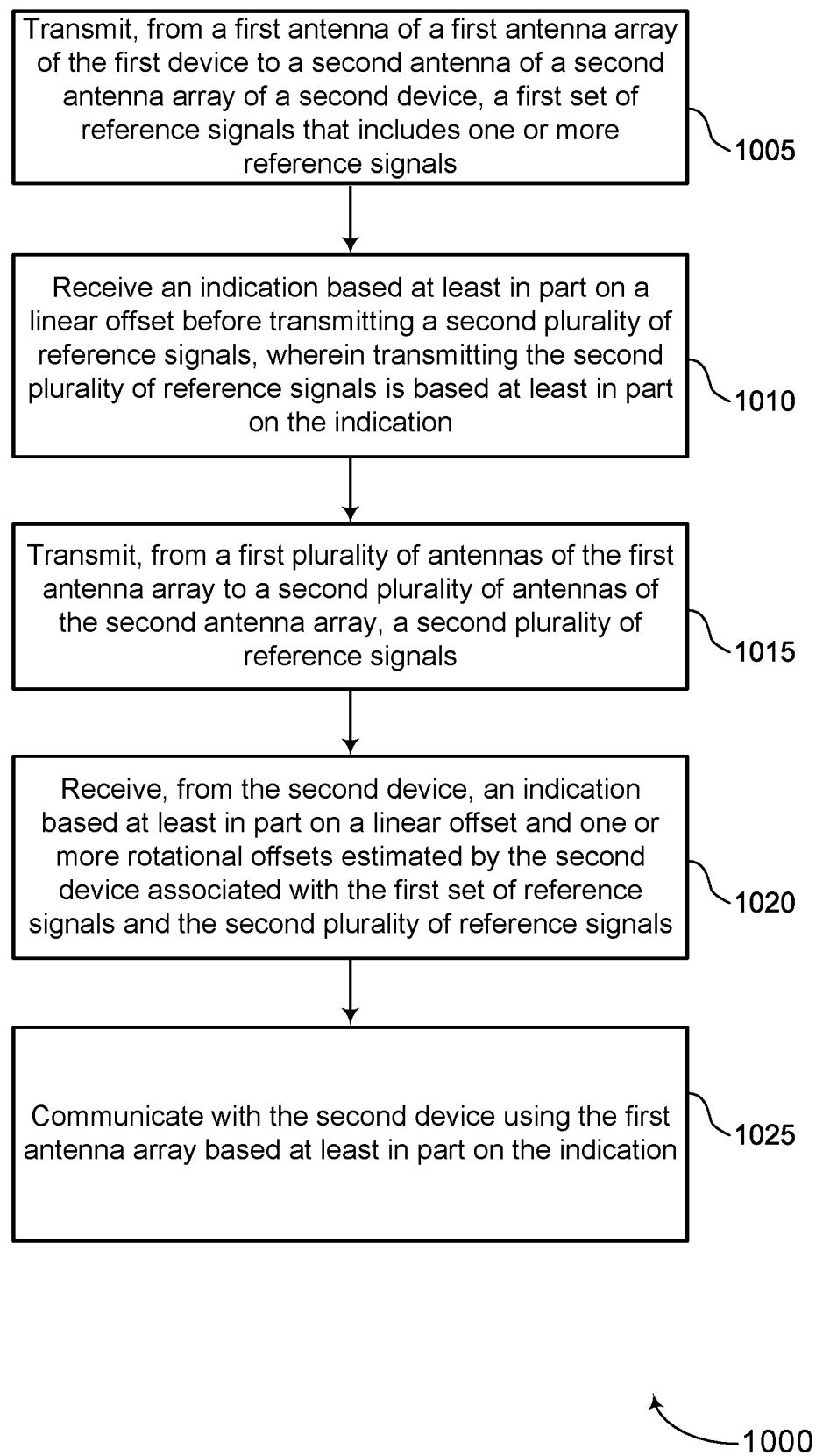

FIG. 10 shows a flowchart illustrating a method 1000 that supports phase pre-compensation for misalignment in accordance with aspects of the present disclosure. The operations of the method 1000 may be implemented by a UE or a base station or its components as described herein. For example, the operations of the method 1000 may be performed by a UE 115 or a base station 105 as described with reference to FIGS. 1-8. In some examples, a UE or a base station may execute a set of instructions to control the functional elements of the UE or the base station to perform the described functions. Additionally or alternatively, the UE or the base station may perform aspects of the described functions using special-purpose hardware.

At 1005, the method may include transmitting, from a first antenna of a first antenna array of the first device to a second antenna of a second antenna array of a second device, a first set of reference signals that includes one or more reference signals. The operations of 1005 may be performed in accordance with examples as disclosed herein. In some examples, aspects of the operations of 1005 may be performed by a linear axis manager 625 as described with reference to FIG. 6.

At 1010, the method may include receiving an indication based on a linear offset before transmitting a second set of multiple reference signals, where transmitting the second set of multiple reference signals is based on the indication. The operations of 1010 may be performed in accordance with examples as disclosed herein. In some examples, aspects of the operations of 1010 may be performed by a linear axis offset manager 645 as described with reference to FIG. 6.

At 1015, the method may include transmitting, from a first set of multiple antennas of the first antenna array to a second set of multiple antennas of the second antenna array, a second set of multiple reference signals. The operations of 1015 may be performed in accordance with examples as disclosed herein. In some examples, aspects of the operations of 1015 may be performed by a rotational offset manager 630 as described with reference to FIG. 6.

At 1020, the method may include receiving, from the second device, an indication based on the linear offset and one or more rotational offsets estimated by the second device associated with the first set of reference signals and the second set of multiple reference signals. The operations of 1020 may be performed in accordance with examples as disclosed herein. In some examples, aspects of the operations of 1020 may be performed by an offset indication manager 635 as described with reference to FIG. 6.

At 1025, the method may include communicating with the second device using the first antenna array based on the indication. The operations of 1030 may be performed in accordance with examples as disclosed herein. In some examples, aspects of the operations of 1030 may be performed by a compensation manager 640 as described with reference to FIG. 6.

Figure 11:
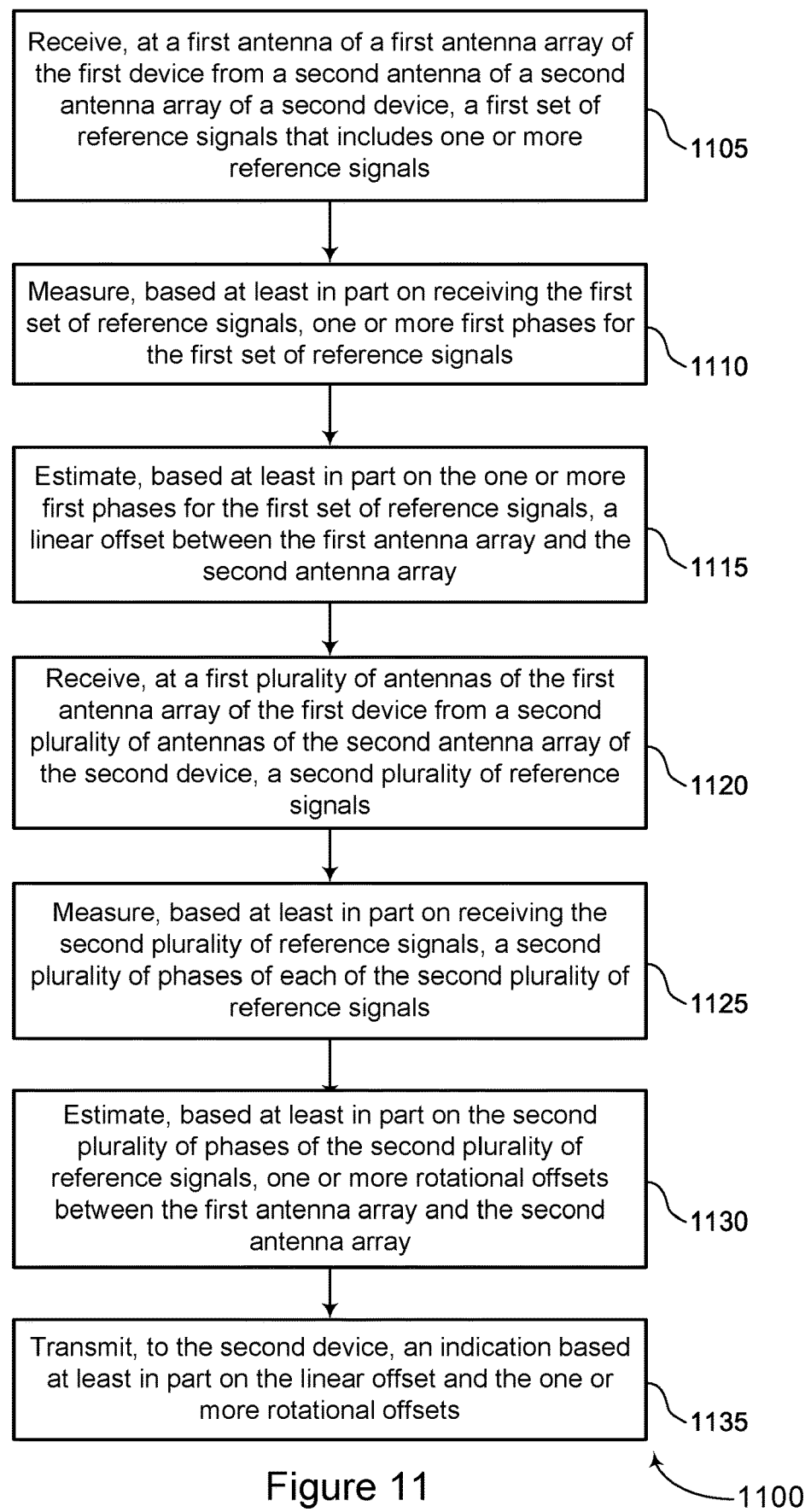

FIG. 11 shows a flowchart illustrating a method 1100 that supports phase pre-compensation for misalignment in accordance with aspects of the present disclosure. The operations of the method 1100 may be implemented by a UE or a base station or its components as described herein. For example, the operations of the method 1100 may be performed by a UE 115 or a base station 105 as described with reference to FIGS. 1-8. In some examples, a UE or a base station may execute a set of instructions to control the functional elements of the UE or the base station to perform the described functions. Additionally or alternatively, the UE or the base station may perform aspects of the described functions using special-purpose hardware.

At 1105, the method may include receiving, at a first antenna of a first antenna array of the first device from a second antenna of a second antenna array of a second device, a first set of reference signals that includes one or more reference signals. The operations of 1105 may be performed in accordance with examples as disclosed herein. In some examples, aspects of the operations of 1105 may be performed by a linear axis manager 625 as described with reference to FIG. 6.

At 1110, the method may include measuring, based on receiving the first set of reference signals, one or more first phases for the first set of reference signals. The operations of 1110 may be performed in accordance with examples as disclosed herein. In some examples, aspects of the operations of 1110 may be performed by a linear axis manager 625 as described with reference to FIG. 6.

At 1115, the method may include estimating, based on the one or more first phases for the first set of reference signals, a linear offset between the first antenna array and the second antenna array. The operations of 1115 may be performed in accordance with examples as disclosed herein. In some examples, aspects of the operations of 1115 may be performed by a linear axis manager 625 as described with reference to FIG. 6.

At 1120, the method may include receiving, at a first set of multiple antennas of the first antenna array of the first device from a second set of multiple antennas of the second antenna array of the second device, a second set of multiple reference signals. The operations of 1120 may be performed in accordance with examples as disclosed herein. In some examples, aspects of the operations of 1120 may be performed by a rotational offset manager 630 as described with reference to FIG. 6.

At 1125, the method may include measuring, based on receiving the second set of multiple reference signals, a second set of multiple phases of each of the second set of multiple reference signals. The operations of 1125 may be performed in accordance with examples as disclosed herein. In some examples, aspects of the operations of 1125 may be performed by a rotational offset manager 630 as described with reference to FIG. 6.

At 1130, the method may include estimating, based on the second set of multiple phases of the second set of multiple reference signals, one or more rotational offsets between the first antenna array and the second antenna array. The operations of 1130 may be performed in accordance with examples as disclosed herein. In some examples, aspects of the operations of 1130 may be performed by a rotational offset manager 630 as described with reference to FIG. 6.

At 1135, the method may include transmitting, to the second device, an indication based on the linear offset and the one or more rotational offsets. The operations of 1135 may be performed in accordance with examples as disclosed herein. In some examples, aspects of the operations of 1135 may be performed by a rotational offset manager 630 as described with reference to FIG. 6.

Figure 12:
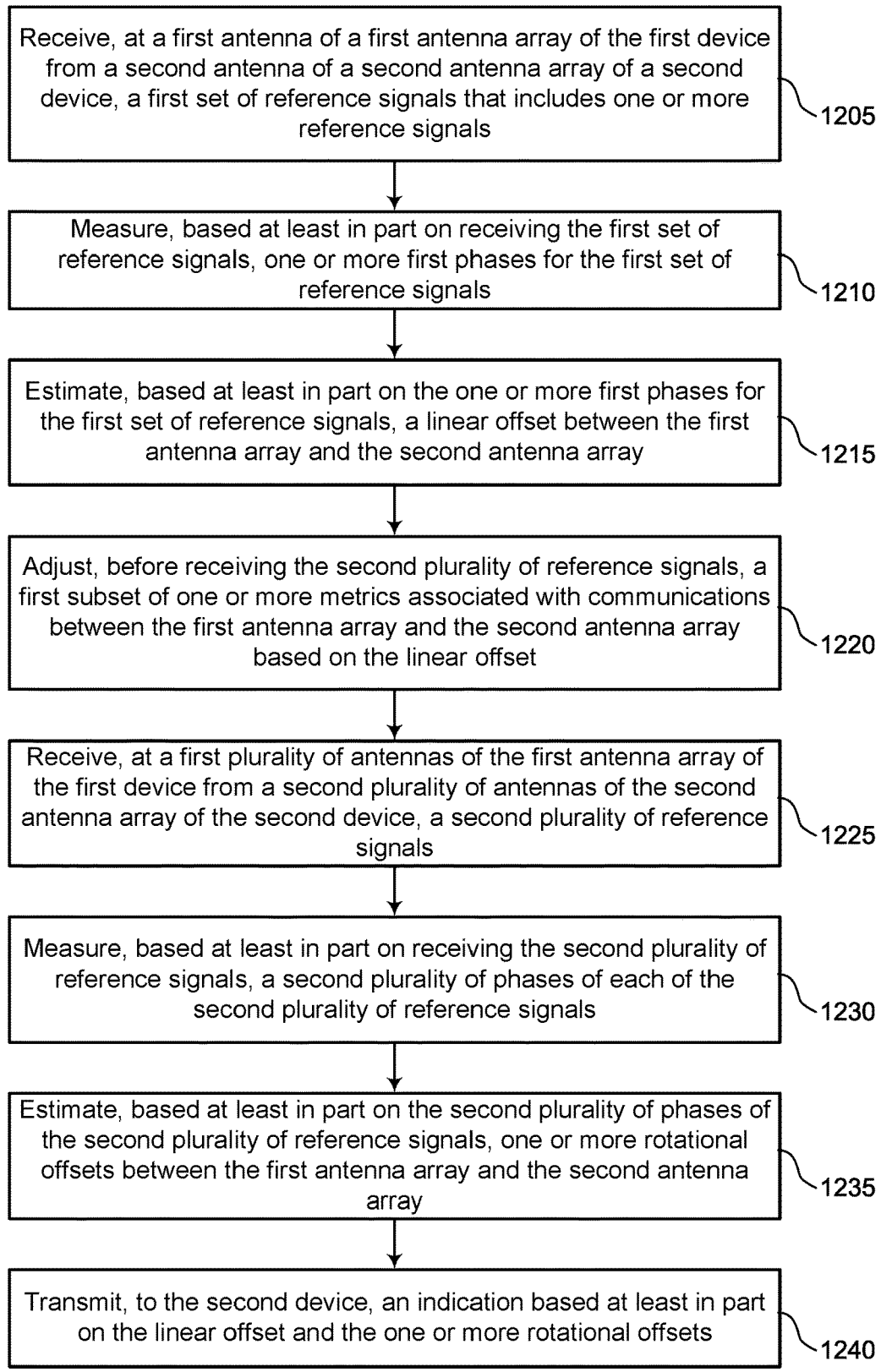

FIG. 12 shows a flowchart illustrating a method 1200 that supports phase pre-compensation for misalignment in accordance with aspects of the present disclosure. The operations of the method 1200 may be implemented by a UE or a base station or its components as described herein. For example, the operations of the method 1200 may be performed by a UE 115 or a base station 105 as described with reference to FIGS. 1-8. In some examples, a UE or a base station may execute a set of instructions to control the functional elements of the UE or the base station to perform the described functions. Additionally or alternatively, the UE or the base station may perform aspects of the described functions using special-purpose hardware.

At 1205, the method may include receiving, at a first antenna of a first antenna array of the first device from a second antenna of a second antenna array of a second device, a first set of reference signals that includes one or more reference signals. The operations of 1205 may be performed in accordance with examples as disclosed herein. In some examples, aspects of the operations of 1205 may be performed by a linear axis manager 625 as described with reference to FIG. 6.

At 1210, the method may include measuring, based on receiving the first set of reference signals, one or more first phases for the first set of reference signals. The operations of 1210 may be performed in accordance with examples as disclosed herein. In some examples, aspects of the operations of 1210 may be performed by a linear axis manager 625 as described with reference to FIG. 6.

At 1215, the method may include estimating, based on the one or more first phases for the first set of reference signals, a linear offset between the first antenna array and the second antenna array. The operations of 1215 may be performed in accordance with examples as disclosed herein. In some examples, aspects of the operations of 1215 may be performed by a linear axis manager 625 as described with reference to FIG. 6.

At 1220, the method may include adjusting, before receiving the second set of multiple reference signals, a first subset of one or more metrics associated with communications between the first antenna array and the second antenna array based on the linear offset. The operations of 1220 may be performed in accordance with examples as disclosed herein. In some examples, aspects of the operations of 1220 may be performed by a linear axis adjustment manager 660 as described with reference to FIG. 6.

At 1225, the method may include receiving, at a first set of multiple antennas of the first antenna array of the first device from a second set of multiple antennas of the second antenna array of the second device, a second set of multiple reference signals. The operations of 1225 may be performed in accordance with examples as disclosed herein. In some examples, aspects of the operations of 1225 may be performed by a rotational offset manager 630 as described with reference to FIG. 6.

At 1230, the method may include measuring, based on receiving the second set of multiple reference signals, a second set of multiple phases of each of the second set of multiple reference signals. The operations of 1230 may be performed in accordance with examples as disclosed herein. In some examples, aspects of the operations of 1230 may be performed by a rotational offset manager 630 as described with reference to FIG. 6.

At 1235, the method may include estimating, based on the second set of multiple phases of the second set of multiple reference signals, one or more rotational offsets between the first antenna array and the second antenna array. The operations of 1235 may be performed in accordance with examples as disclosed herein. In some examples, aspects of the operations of 1235 may be performed by a rotational offset manager 630 as described with reference to FIG. 6.

At 1240, the method may include transmitting, to the second device, an indication based on the linear offset and the one or more rotational offsets. The operations of 1240 may be performed in accordance with examples as disclosed herein. In some examples, aspects of the operations of 1240 may be performed by a rotational offset manager 630 as described with reference to FIG. 6.

Figure 13:
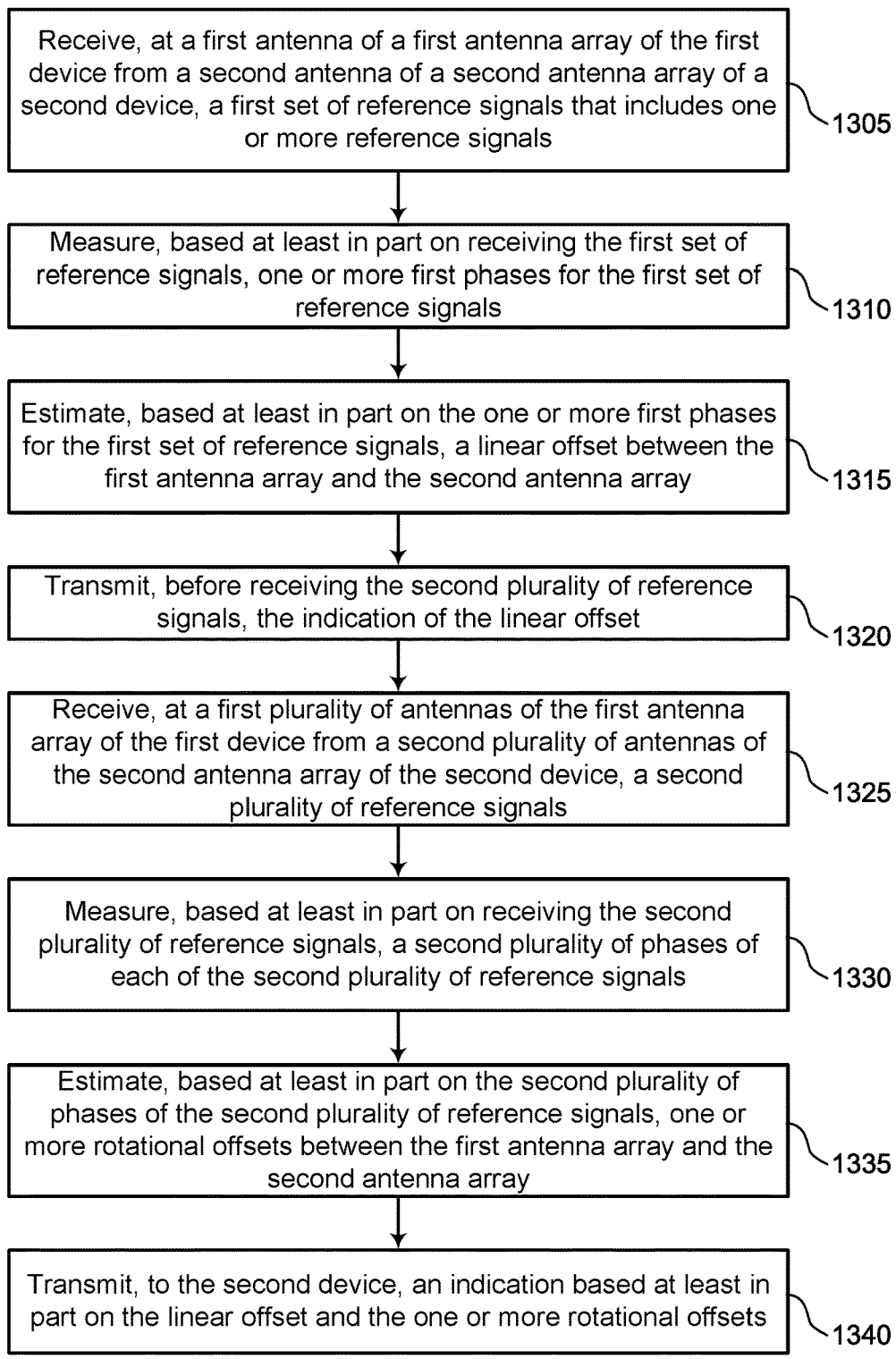

FIG. 13 shows a flowchart illustrating a method 1300 that supports phase pre-compensation for misalignment in accordance with aspects of the present disclosure. The operations of the method 1300 may be implemented by a UE or a base station or its components as described herein. For example, the operations of the method 1300 may be performed by a UE 115 or a base station 105 as described with reference to FIGS. 1 through 8. In some examples, a UE or a base station may execute a set of instructions to control the functional elements of the UE or the base station to perform the described functions. Additionally or alternatively, the UE or the base station may perform aspects of the described functions using special-purpose hardware.

At 1305, the method may include receiving, at a first antenna of a first antenna array of the first device from a second antenna of a second antenna array of a second device, a first set of reference signals that includes one or more reference signals. The operations of 1305 may be performed in accordance with examples as disclosed herein. In some examples, aspects of the operations of 1305 may be performed by a linear axis manager 625 as described with reference to FIG. 6.

At 1310, the method may include measuring, based on receiving the first set of reference signals, one or more first phases for the first set of reference signals. The operations of 1310 may be performed in accordance with examples as disclosed herein. In some examples, aspects of the operations of 1310 may be performed by a linear axis manager 625 as described with reference to FIG. 6.

At 1315, the method may include estimating, based on the one or more first phases for the first set of reference signals, a linear offset between the first antenna array and the second antenna array. The operations of 1315 may be performed in accordance with examples as disclosed herein. In some examples, aspects of the operations of 1315 may be performed by a linear axis manager 625 as described with reference to FIG. 6.

At 1320, the method may include transmitting, before receiving the second set of multiple reference signals, the indication of the linear offset. The operations of 1320 may be performed in accordance with examples as disclosed herein. In some examples, aspects of the operations of 1320 may be performed by a linear axis offset indication manager 665 as described with reference to FIG. 6.

At 1325, the method may include receiving, at a first set of multiple antennas of the first antenna array of the first device from a second set of multiple antennas of the second antenna array of the second device, a second set of multiple reference signals. The operations of 1325 may be performed in accordance with examples as disclosed herein. In some examples, aspects of the operations of 1325 may be performed by a rotational offset manager 630 as described with reference to FIG. 6.

At 1330, the method may include measuring, based on receiving the second set of multiple reference signals, a second set of multiple phases of each of the second set of multiple reference signals. The operations of 1330 may be performed in accordance with examples as disclosed herein. In some examples, aspects of the operations of 1330 may be performed by a rotational offset manager 630 as described with reference to FIG. 6.

At 1335, the method may include estimating, based on the second set of multiple phases of the second set of multiple reference signals, one or more rotational offsets between the first antenna array and the second antenna array. The operations of 1335 may be performed in accordance with examples as disclosed herein. In some examples, aspects of the operations of 1335 may be performed by a rotational offset manager 630 as described with reference to FIG. 6.

At 1340, the method may include transmitting, to the second device, an indication based on the linear offset and the one or more rotational offsets. The operations of 1340 may be performed in accordance with examples as disclosed herein. In some examples, aspects of the operations of 1340 may be performed by a rotational offset manager 630 as described with reference to FIG. 6.

The following provides an overview of aspects of the present disclosure:

Aspect 1: A method for wireless communication at a first device, comprising: transmitting, from a first antenna of a first antenna array of the first device to a second antenna of a second antenna array of a second device, a first set of reference signals that includes one or more reference signals; transmitting, from a first plurality of antennas of the first antenna array to a second plurality of antennas of the second antenna array, a second plurality of reference signals; receiving, from the second device, an indication based at least in part on a linear offset and one or more rotational offsets estimated by the second device associated with the first set of reference signals and the second plurality of reference signals; and communicating with the second device using the first antenna array based at least in part on the indication.

Aspect 2: The method of aspect 1, further comprising: adjusting one or more metrics for communications between the first antenna array and the second antenna array based at least in part on the indication, wherein the communicating with the second device using the first antenna array is based at least in part on adjusting the one or more metrics.

Aspect 3: The method of any of aspects 1 through 2, further comprising receiving the indication based at least in part on the linear offset before transmitting the second plurality of reference signals, wherein transmitting the second plurality of reference signals is based at least in part on the indication.

Aspect 4: The method of aspect 3, further comprising adjusting, before transmitting the second plurality of reference signals, a first subset of one or more metrics based at least in part on the indication.

Aspect 5: The method of any of aspects 1 through 4, wherein the first set of reference signals are transmitted at a first frequency that is within a frequency threshold of a second frequency used for transmitting the second plurality of reference signals.

Aspect 6: The method of any of aspects 1 through 5, wherein the indication comprises information associated with one or more first phases for the first set of reference signals measured by the second device, the linear offset, a second plurality of phases for the second plurality of reference signals measured by the second device, the one or more rotational offsets, or any combination thereof.

Aspect 7: The method of any of aspects 1 through 6, wherein the first antenna is located at a central location of the first antenna array and the first plurality of antennas are located at a non-central location of the first antenna array.

Aspect 8: A method for wireless communication at a first device, comprising: receiving, at a first antenna of a first antenna array of the first device from a second antenna of a second antenna array of a second device, a first set of reference signals that includes one or more reference signals; measuring, based at least in part on receiving the first set of reference signals, one or more first phases for the first set of reference signals; estimating, based at least in part on the one or more first phases for the first set of reference signals, a linear offset between the first antenna array and the second antenna array; receiving, at a first plurality of antennas of the first antenna array of the first device from a second plurality of antennas of the second antenna array of the second device, a second plurality of reference signals; measuring, based at least in part on receiving the second plurality of reference signals, a second plurality of phases of each of the second plurality of reference signals; estimating, based at least in part on the second plurality of phases of the second plurality of reference signals, one or more rotational offsets between the first antenna array and the second antenna array; and transmitting, to the second device, an indication based at least in part on the linear offset and the one or more rotational offsets.

Aspect 9: The method of aspect 8, further comprising adjusting, before receiving the second plurality of reference signals, a first subset of one or more metrics associated with communications between the first antenna array and the second antenna array based on the linear offset.

Aspect 10: The method of any of aspects 8 through 9, further comprising transmitting, before receiving the second plurality of reference signals, the indication of the linear offset.

Aspect 11: The method of any of aspects 8 through 10, wherein estimating the linear offset comprises: measuring, based at least in part on the one or more first phases, a difference between a first linear distance between the first antenna and the second antenna and a second linear distance between the first antenna of the first antenna array and a third antenna of the second antenna array, wherein estimating the linear offset is based at least in part on the difference.

Aspect 12: The method of aspect 11, wherein the first linear distance and the second linear distance identifies a horizontal distance along a horizontal axis and a vertical distance along a vertical axis, the horizontal axis being perpendicular to the plane of the second antenna array and the vertical axis being along a vertical plane of the second antenna array.

Aspect 13: The method of any of aspects 11 through 12, wherein the first set of reference signals are transmitted at a first frequency that is within a frequency threshold of a second frequency used for transmitting the second plurality of reference signals.

Aspect 14: The method of any of aspects 8 through 13, wherein estimating the one or more rotational offsets comprises: estimating the one or more rotational offsets based at least in part on adjusting the position of the first antenna array for the linear offset.

Aspect 15: The method of any of aspects 8 through 14, further comprising determining a phase accuracy associated with the one or more first phases, the second plurality of phases, or both, wherein the adjusting is based at least in part on the phase accuracy.

Aspect 16: The method of aspect 15, further comprising determining a noise level for a channel between the first antenna array and the second antenna array, wherein the phase accuracy is based at least in part on the noise level for the channel.

Aspect 17: The method of any of aspects 8 through 16, wherein the indication comprises information associated with the one or more first phases for the first set of reference signals, the linear offset, the second plurality of phases for the second plurality of reference signals, the one or more rotational offsets, or any combination thereof.

Aspect 18: The method of any of aspects 8 through 17, further comprising adjusting one or more metrics for communications between the first antenna array and the second antenna array based at least in part on the linear offset and the one or more rotational offsets.

Aspect 19: The method of any of aspects 8 through 18, wherein the first antenna is located at a central location of the first antenna array and the first plurality of antennas are located at a non-central location of the first antenna array.

Aspect 20: The method of any of aspects 8 through 19, wherein each antenna of the first plurality of antennas are positioned at a location of the first antenna array that corresponds to each antenna of the second plurality of antennas of the second antenna array.

Aspect 21: An apparatus for wireless communication at a first device, comprising a processor; memory coupled with the processor; and instructions stored in the memory and executable by the processor to cause the apparatus to perform a method of any of aspects 1 through 7.

Aspect 22: An apparatus for wireless communication at a first device, comprising at least one means for performing a method of any of aspects 1 through 7.

Aspect 23: A non-transitory computer-readable medium storing code for wireless communication at a first device, the code comprising instructions executable by a processor to perform a method of any of aspects 1 through 7.

Aspect 24: An apparatus for wireless communication at a first device, comprising a processor; memory coupled with the processor; and instructions stored in the memory and executable by the processor to cause the apparatus to perform a method of any of aspects 8 through 20.

Aspect 25: An apparatus for wireless communication at a first device, comprising at least one means for performing a method of any of aspects 8 through 20.

Aspect 26: A non-transitory computer-readable medium storing code for wireless communication at a first device, the code comprising instructions executable by a processor to perform a method of any of aspects 8 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication by a first wireless communication device, comprising:
   transmitting, from at least a first antenna of a first antenna array of the first wireless communication device to at least a second antenna of a second antenna array of a second wireless communication device, a first set of reference signals that includes one or more reference signals, the first antenna array including a first set of antennas that includes a plurality of antennas including the first antenna;
   transmitting, from two or more antennas of the first set of antennas of the first antenna array to two or more antennas of a second set of antennas of the second antenna array, a second set of reference signals that includes a plurality of reference signals, each respective reference signal of the plurality of reference signals being associated with a respective antenna of the first set of antennas and a respective antenna of the second set of antennas;

receiving, from the second wireless communication device in association with transmitting the first set of reference signals, an indication of a linear offset between the first antenna array and the second antenna array associated with phase measurements of the first set of reference signals;

receiving, from the second wireless communication device in association with transmitting the second set of reference signals, an indication of one or more rotational offsets between the first antenna array and the second antenna array associated with a plurality of phase measurements of the plurality of reference signals of the second set of reference signals; and communicating with the second wireless communication device using the first antenna array in accordance with the indication of the linear offset and the indication of the one or more rotational offsets.

2. The method of claim 1, further comprising adjusting one or more metrics for communications between the first antenna array and the second antenna array based at least in part on the indication of the linear offset and the indication of the one or more rotational offsets, wherein the communicating with the second wireless communication device using the first antenna array is based at least in part on adjusting the one or more metrics.

3. The method of claim 1, further comprising receiving the indication of the linear offset before transmitting the second set of reference signals, wherein transmitting the second set of reference signals is based at least in part on the indication of the linear offset.

4. The method of claim 3, further comprising adjusting, before transmitting the second set of reference signals, a first subset of one or more metrics based at least in part on the indication of the linear offset.

5. The method of claim 1, wherein the first set of reference signals are transmitted at a first frequency that is within a frequency threshold of a second frequency used for transmitting the second set of reference signals.

6. The method of claim 1, wherein the first antenna is located at a central location of the first antenna array and the two or more antennas of the first set of antennas are located at a non-central location of the first antenna array.

7. The method of claim 1, wherein communicating with the second wireless communication device comprises precompensating a signal in accordance with the linear offset and the one or more rotational offsets.

8. The method of claim 7, wherein precompensating the signal comprises adjusting weights for beamforming or beam steering the signal to the second wireless communication device.

9. The method of claim 1, wherein the indication of the linear offset includes the phase measurements of the first set of reference signals, and wherein the indication of the one or more rotational offsets includes the phase measurements of the second set of reference signals.

10. The method of claim 1, wherein the one or more rotational offsets comprise at least three rotational offsets along at least three respective axes between the first antenna array and the second antenna array.

11. A method for wireless communication at a first wireless communication device, comprising:

receiving, at at least a first antenna of a first antenna array of the first wireless communication device from at least a second antenna of a second antenna array of a second wireless communication device, a first set of one or more reference signals, the first antenna array including a first set of antennas that includes a plurality of antennas including the first antenna;

measuring, associated with receiving the first set of reference signals, a first set of one or more phases for the first set of reference signals;

estimating, in accordance with the first set of phases for the first set of reference signals, a linear offset between the first antenna array and the second antenna array;

receiving, at two or more antennas of the first set of antennas of the first antenna array of the first wireless communication device from two or more antennas of a second set of antennas of the second antenna array of the second wireless communication device, a second set of reference signals that includes a plurality of reference signals, each respective reference signal of the plurality of reference signals being associated with a respective antenna of the first set of antennas and a respective antenna of the second set of antennas;

measuring, associated with receiving the second set of reference signals, a second set of phases that includes a plurality of phases, each phase of the second set of phases being measured for a respective reference signal of the second set of reference signals;

estimating, in accordance with the second set of phases of the second set of reference signals, one or more rotational offsets between the first antenna array and the second antenna array; and transmitting, to the second wireless communication device, an indication of the linear offset and an indication of the one or more rotational offsets.

12. The method of claim 11, further comprising adjusting, before receiving the second set of reference signals, a first subset of one or more metrics associated with communications between the first antenna array and the second antenna array based on the linear offset.

13. The method of claim 11, further comprising transmitting, before receiving the second set of reference signals, the indication of the linear offset.

14. The method of claim 11, wherein estimating the linear offset comprises:

measuring, based at least in part on the first set of phases, a difference between a first linear distance between the first antenna and the second antenna and a second linear distance between the first antenna of the first antenna array and a third antenna of the second antenna array, wherein estimating the linear offset is based at least in part on the difference.

15. The method of claim 14, wherein the first linear distance and the second linear distance identifies a horizontal distance along a horizontal axis and a vertical distance along a vertical axis, the horizontal axis being perpendicular to a plane of the second antenna array and the vertical axis being along a vertical plane of the second antenna array.

16. The method of claim 14, wherein the first set of reference signals are transmitted at a first frequency that is within a frequency threshold of a second frequency used for transmitting the second set of reference signals.

17. The method of claim 11, wherein estimating the one or more rotational offsets comprises:

estimating the one or more rotational offsets based at least in part on adjusting a position of the first antenna array for the linear offset.

18. The method of claim 17, further comprising determining a phase accuracy associated with the first set of phases, the second set of phases, or both, wherein the adjusting is based at least in part on the phase accuracy.

19. The method of claim 18, further comprising determining a noise level for a channel between the first antenna array and the second antenna array, wherein the phase accuracy is based at least in part on the noise level for the channel.

20. The method of claim 11, further comprising adjusting one or more metrics for communications between the first antenna array and the second antenna array based at least in part on the linear offset and the one or more rotational offsets.

21. The method of claim 11, wherein the first antenna is located at a central location of the first antenna array and the two or more antennas of the first set of antennas are located at a non-central location of the first antenna array.

22. The method of claim 11, wherein each antenna of the first set of antennas are positioned at a location of the first antenna array that corresponds to each antenna of the second set of antennas of the second antenna array.

23. The method of claim 11, wherein the indication of the linear offset includes the first set of phases for the first set of reference signals, and wherein the indication of the one or more rotational offsets includes the second set of phases for the second set of reference signals.

24. The method of claim 11, wherein the one or more rotational offsets comprise at least three rotational offsets along at least three respective axes between the first antenna array and the second antenna array.

25. A first wireless communication device, comprising:
one or more processors; and
one or more memories coupled with the one or more processors and that store processor-executable code that, when executed by the one or more processors, is configured to cause the first wireless communication device to:
transmit, from at least a first antenna of a first antenna array of the first wireless communication device to at least a second antenna of a second antenna array of a second wireless communication device, a first set of reference signals that includes one or more reference signals, the first antenna array including a first set of antennas that includes a plurality of antennas including the first antenna;
transmit, from two or more antennas of the first set of antennas of the first antenna array to two or more antennas of a second set of antennas of the second antenna array, a second set of reference signals that includes a plurality of reference signals, each respective reference signal of the plurality of reference signals being associated with a respective antenna of the first set of antennas and a respective antenna of the second set of antennas;
receive, from the second wireless communication device in association with transmitting the first set of reference signals, an indication of a linear offset between the first antenna array and the second antenna array associated with phase measurements of the first set of reference signals;
receive, from the second wireless communication device in association with transmitting the second set of reference signals, an indication of one or more rotational offsets between the first antenna array and the second antenna array associated with a plurality of phase measurements of the plurality of reference signals of the second set of reference signals; and
communicate with the second wireless communication device using the first antenna array in accordance with the indication of the linear offset and the indication of the one or more rotational offsets.

26. The first wireless communication device of claim 25, wherein the code is further executable by the one or more processors to cause the first wireless communication device to adjust one or more metrics for communications between the first antenna array and the second antenna array based at least in part on the indication, wherein the communicating with the second wireless communication device using the first antenna array is based at least in part on adjusting the one or more metrics.

27. The first wireless communication device of claim 25, wherein the code is further executable by the one or more processors to cause the first wireless communication device to receive the indication based at least in part on the linear offset before transmitting the second set of reference signals, wherein transmitting the second set of reference signals is based at least in part on the indication.

28. The first wireless communication device of claim 27, wherein the code is further executable by the one or more processors to cause the first wireless communication device to adjust, before transmitting the second set of reference signals, a first subset of one or more metrics based at least in part on the indication.

29. The first wireless communication device of claim 25, wherein the first set of reference signals are transmitted at a first frequency that is within a frequency threshold of a second frequency used for transmitting the second set of reference signals.

30. The first wireless communication device of claim 25, wherein the first antenna is located at a central location of the first antenna array and the two or more antennas of the first set of antennas are located at a non-central location of the first antenna array.

31. The first wireless communication device of claim 25, wherein communicating with the second wireless communication device comprises precompensating a signal in accordance with the linear offset and the one or more rotational offsets.

32. The first wireless communication device of claim 31, wherein precompensating the signal comprises adjusting weights for beamforming or beam steering the signal to the second wireless communication device.

33. The first wireless communication device of claim 25, wherein the indication of the linear offset includes the phase measurements of the first set of reference signals, and wherein the indication of the one or more rotational offsets includes the phase measurements of the second set of reference signals.

34. The first wireless communication device of claim 25, wherein the one or more rotational offsets comprise at least three rotational offsets along at least three respective axes between the first antenna array and the second antenna array.

35. A first wireless communication device, comprising:
one or more processors; and
one or more memories coupled with the one or more processors and that store processor-executable code that, when executed by the one or more processors, is configured to cause the first wireless communication device to:
receive, at at least a first antenna of a first antenna array of the first wireless communication device from at least a second antenna of a second antenna array of a second wireless communication device, a first set of one or more reference signals, the first antenna array including a first set of antennas that includes a plurality of antennas including the first antenna;

measure, associated with receiving the first set of reference signals, a first set of one or more phases for the first set of reference signals;

estimate, in accordance with the first set of phases for the first set of reference signals, a linear offset between the first antenna array and the second antenna array;

receive, at two or more antennas of the first set of antennas of the first antenna array of the first wireless communication device from two or more antennas of a second set of antennas of the second antenna array of the second wireless communication device, a second set of reference signals that includes a plurality of reference signals, each respective reference signal of the plurality of reference signals being associated with a respective antenna of the first set of antennas and a respective antenna of the second set of antennas;

measure, associated with receiving the second set of reference signals, a second set of phases that includes a plurality of phases, each phase of the second set of phases being measured for a respective reference signal of the second set of reference signals;

estimate, in accordance with the second set of phases of the second set of reference signals, one or more rotational offsets between the first antenna array and the second antenna array; and transmit, to the second wireless communication device, an indication of the linear offset and an indication of the one or more rotational offsets.

36. The first wireless communication device of claim 35, wherein the code is further executable by the one or more processors to cause the first wireless communication device to adjust, before receiving the second set of reference signals, a first subset of one or more metrics associated with communications between the first antenna array and the second antenna array based on the linear offset.

37. The first wireless communication device of claim 35, wherein the code is further executable by the one or more processors to cause the first wireless communication device to transmit, before receiving the second set of reference signals, the indication of the linear offset.

38. The first wireless communication device of claim 35, wherein the indication of the linear offset includes the first set of phases for the first set of reference signals, and wherein the indication of the one or more rotational offsets includes the second set of phases for the second set of reference signals.

39. The first wireless communication device of claim 35, wherein the one or more rotational offsets comprise at least three rotational offsets along at least three respective axes between the first antenna array and the second antenna array.

\* \* \* \* \*